(12) United States Patent
Neill et al.

(10) Patent No.: US 12,307,813 B2
(45) Date of Patent: May 20, 2025

(54) SYSTEMS AND METHODS OF DETECTING INCORRECT MASK USAGE

(71) Applicant: Tyco Fire & Security GmbH, Neuhausen am Rheinfall (CH)

(72) Inventors: Terence Neill, Lisburn (GB); Alexis B. Ehrlich, Boca Raton, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 188 days.

(21) Appl. No.: 17/180,074

(22) Filed: Feb. 19, 2021

(65) Prior Publication Data

US 2022/0269878 A1  Aug. 25, 2022

(51) Int. Cl.
G06V 40/16 (2022.01)
G08B 21/18 (2006.01)

(52) U.S. Cl.
CPC ........... G06V 40/171 (2022.01); G08B 21/18 (2013.01)

(58) Field of Classification Search
CPC .... G06V 40/171; G06V 40/168; G06V 20/52; G08B 21/18
See application file for complete search history.

(56) References Cited

U.S. PATENT DOCUMENTS

| | | | | |
|---|---|---|---|---|
| 8,085,144 B2 * | 12/2011 | Appelt | ................ | A61B 5/6814 128/204.23 |
| 10,984,225 B1 * | 4/2021 | Ghosh | ................ | G06V 40/161 |
| 11,520,871 B2 * | 12/2022 | Nicol, II | ................ | G06F 21/36 |
| 2010/0183218 A1 * | 7/2010 | Naito | ................ | G06V 40/171 382/159 |
| 2013/0163829 A1 * | 6/2013 | Kim | ................ | G06V 40/172 382/118 |
| 2013/0243274 A1 * | 9/2013 | Sukegawa | ............... | G06V 40/16 382/118 |
| 2013/0282609 A1 * | 10/2013 | Au | ................ | G06Q 50/265 705/325 |
| 2019/0122065 A1 * | 4/2019 | Ungarish | ............. | G06V 10/255 |
| 2020/0042770 A1 * | 2/2020 | Yan | ................ | G06V 10/26 |
| 2020/0365002 A1 | 11/2020 | Modiano | | |
| 2021/0081956 A1 * | 3/2021 | Tessier | ................ | G05B 19/042 |
| 2021/0174653 A1 * | 6/2021 | Masselink | ........ | G08B 13/19645 |
| 2021/0326579 A1 * | 10/2021 | Harris | ................ | G06V 40/172 |
| 2021/0357649 A1 * | 11/2021 | Adam | ................ | G06V 20/53 |
| 2021/0357654 A1 * | 11/2021 | Adam | ................ | G06V 20/52 |
| 2023/0391583 A1 * | 12/2023 | Saito | ................ | B66B 3/00 |

OTHER PUBLICATIONS

International Search Report and Written opinion for International Patent Application No. PCT/US2022/070540, mailed May 24, 2022 (13 pages).

Inamdar et al., "Real-Time Face Mask Identification Using Facemasknet Deep Learning Network," Social Science Research Network, pp. 1-7 (2020).

* cited by examiner

*Primary Examiner* — Wassim Mahrouka
(74) *Attorney, Agent, or Firm* — ArentFox Schiff LLP

(57) ABSTRACT

Example aspects include a method, apparatus and computer-readable medium of enforcing a mask wearing policy, comprising monitoring video frames of one or more video feeds. The aspects further include detecting one or more persons in the video frames. Additionally, the aspects further include determining whether the one or more persons are in violation of a mask wearing policy. Additionally, the aspects further include generating an alert in response to determining that the one or more persons are in violation of the mask wearing policy.

24 Claims, 9 Drawing Sheets

SYSTEMS AND METHODS OF DETECTING INCORRECT MASK USAGE

BACKGROUND

Technical Field

The present disclosure relates generally to video monitoring systems, and more particularly, to systems and methods for using video analytics to detect incorrect mask usage by persons that appear in a video feed.

INTRODUCTION

Video surveillance systems may frequently be used to monitor desired environments, such as, but not limited to, retail store premises, office buildings, distribution centers, factories, parks, and open spaces. Furthermore, entities that own, manage, or use such environments may implement mask wearing policies designed to reduce the spread of a contagious disease (e.g., COVID-19) by occupants or visitors to those environments. For example, it may be advantageous to automatically detect whether the occupants and visitors to an environment are wearing a mask correctly. That is, to detect that the mask is worn in a manner that covers at least the nose and mouth of the wearer. However, conventional video surveillance systems may not provide solutions for automatic detection of incorrect mask usage. As a result, entities may have to resort to manual processes to implement mask wearing policies, which may be time consuming and/or inefficient. Thus, improved solutions for enforcing mask wearing policies are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method of detecting incorrect mask usage, comprising monitoring video frames of one or more video feeds. The method further includes detecting one or more persons in the video frames. Additionally, the method further includes determining whether the one or more persons are in violation of a mask wearing policy. Additionally, the method further includes generating an alert in response to determining that the one or more persons are in violation of the mask wearing policy Another example aspect includes an apparatus for detecting incorrect mask usage, comprising a non-transitory memory storing computer-executable instructions and a processor communicatively coupled with the non-transitory memory. The processor is configured to execute the instructions to monitor video frames of one or more video feeds. The processor is further configured to execute further instructions to detect one or more persons in the video frames. Additionally, the processor further configured to execute further instructions to determine whether the one or more persons are in violation of a mask wearing policy. Additionally, the processor further configured to execute further instructions to generate an alert in response to determining that the one or more persons are in violation of the mask wearing policy.

Another example aspect includes an apparatus for detecting incorrect mask usage, comprising means for monitoring video frames of one or more video feeds. The apparatus further includes means for detecting one or more persons in the video frames. Additionally, the apparatus further includes means for determining whether the one or more persons are in violation of a mask wearing policy. Additionally, the apparatus further includes means for generating an alert in response to determining that the one or more persons are in violation of the mask wearing policy.

Another example aspect includes a non-transitory computer-readable medium storing computer-readable instructions for detecting incorrect mask usage, executable by a processor to monitor video frames of one or more video feeds. The instructions are further executable to detect one or more persons in the video frames. Additionally, the instructions are further executable to determine whether the one or more persons are in violation of a mask wearing policy. Additionally, the instructions are further executable to generate an alert in response to determining that the one or more persons are in violation of the mask wearing policy.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
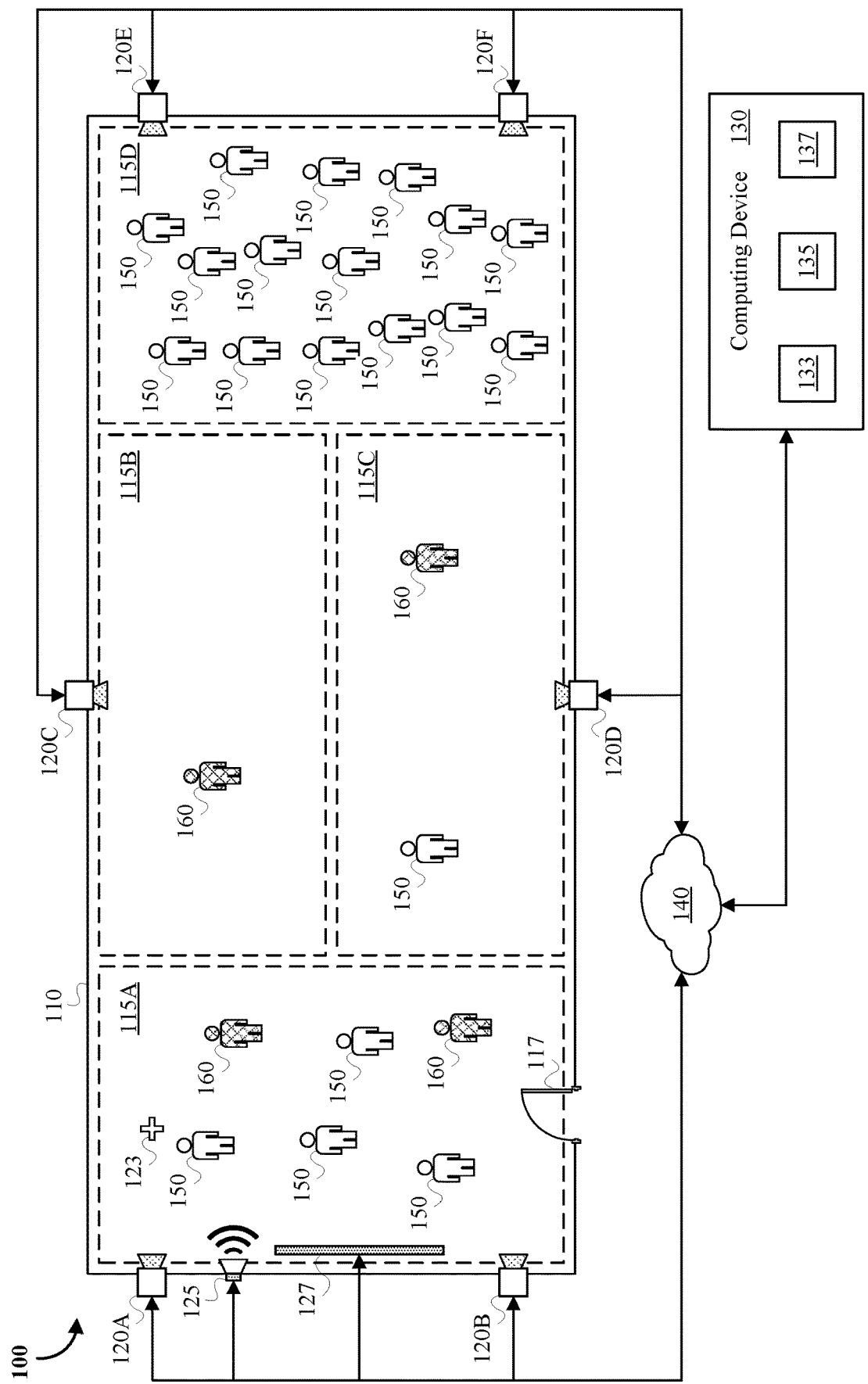
FIG. 1 is a schematic diagram of an example environment including a system for detecting incorrect mask usage, in accordance with various aspects of the present disclosure.

It will be readily understood that the components of the aspects as generally described herein and illustrated in the appended figures could be arranged and designed in a wide variety of different configurations. Thus, the following more detailed description of various aspects, as represented in the figures, is not intended to limit the scope of the present disclosure, but is merely representative of various aspects. While the various aspects of the aspects are presented in drawings, the drawings are not necessarily drawn to scale unless specifically indicated.

The present solution may be embodied in other specific forms without departing from its spirit or essential characteristics. The described aspects are to be considered in all respects only as illustrative and not restrictive. The scope of the present solution is indicated by the appended claims rather than by this detailed description. All changes that come within the meaning and range of equivalency of the claims are to be embraced within their scope.

Reference throughout this specification to features, advantages, or similar language does not imply that all of the features and advantages that may be realized with the present solution should be or are in any single aspect of the present solution. Rather, language referring to the features and advantages is understood to mean that a specific feature, advantage, or characteristic described in connection with an aspect is included in at least one aspect of the present solution. Thus, discussions of the features and advantages, and similar language, throughout the specification may, but do not necessarily, refer to the same aspect.

Furthermore, the described features, advantages, and characteristics of the present solution may be combined in any suitable manner in one or more aspects. One skilled in the relevant art will recognize, in light of the description herein, that the present solution can be practiced without one or more of the specific features or advantages of a particular aspect. In other instances, additional features and advantages may be recognized in certain aspects that may not be present in all aspects of the present solution.

Reference throughout this specification to "one aspect," "an aspect," or similar language means that a particular feature, structure, or characteristic described in connection with the indicated aspect is included in at least one aspect of the present solution. Thus, the phrases "in one aspect", "in an aspect," and similar language throughout this specification may, but do not necessarily, all refer to the same aspect.

As used in this document, the singular form "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

Conventional video surveillance systems may not be suitable for enforcement of mask wearing policies in environments (e.g., retail store premises, office buildings, distribution centers, factories, parks, open spaces). For example, a conventional video surveillance system may not provide for automatic detection of incorrect mask usage by one or more persons at the environments based on video feeds from cameras located at the environments. That is, the conventional video surveillance system may not be able to determine whether occupants and/or visitors appearing on the video feeds are wearing a mask correctly (e.g., covering at least the nose and mouth of the wearer). Alternatively or additionally, the conventional video surveillance system may not be able to determine whether other additional requirements of a mask wearing policy are met, such as occupancy rate thresholds, social distancing constraints, environmental thresholds, and the like. As such, an entity that owns, manages, or uses these environments may have to resort to manual processes to implement the mask wearing policy. However, implementation of these manual processes may be impractical given that the conventional video surveillance system may be monitoring hundreds of video feeds from cameras located at many environments. In addition, image quality of the cameras used by the conventional video surveillance system may not be sufficient to determine whether a person is wearing a mask correctly. Further, these manual processes may be excessively time and labor intensive to implement, as well as, subject to inaccuracies due to human error. For example, security personnel tasked with monitoring the video feeds may be occupied assisting visitors, engaged in other duties, and/or otherwise distracted from the video feed monitors.

Examples of the technology disclosed herein provide for multiple manners to detect incorrect mask usage. In certain aspects, the automatic detection of incorrect mask usage may reduce time and labor needed for enforcement of mask wearing policies. Further, aspects presented herein may increase accuracy and effectiveness of enforcement of the mask wearing policy over conventional video surveillance systems.

These and other features of the present disclosure are discussed in detail below with regard to FIGS. 1-9.

FIG. 1 is a diagram illustrating an example video surveillance system 100. The video surveillance system 100 may be configured to monitor one or more areas of environment 110. The environment 110 may be a retail store premise, an office building, a distribution center, a factory, a park, or an open space. The present solution is not limited in this regard, and can be used in other environments. Notably, the present solution may be employed in any environment in which mask wearing policies need to be enforced.

The video surveillance system 100 may be configured to monitor the environment 110, or a portion of the environment 110, and to detect one or more persons 150, 160 that may be located within the environment 110. Alternatively or additionally, the video surveillance system may be configured to monitor one or more environments. The video surveillance system 100 may be further configured to determine whether the one or more persons 150, 160 are wearing a mask correctly or incorrectly. The persons 150 may represent one or more persons that may be wearing a mask correctly (e.g., both nose and mouth are covered) and the persons 160 may represent one or more persons that may be wearing the mask incorrectly (e.g., nose and/or mouth are uncovered) and/or may not be wearing a mask.

The video surveillance system 100 may employ one or more cameras 120A-120F (generally referred to herein as "camera(s) 120") that may be arranged to capture video from one or more areas 115A-115D (generally referred to herein as "area(s) 115") of the environment 110. For example, cameras 120A and 120B may capture video from area 115A, camera 120C may capture video from area 115B, camera 120D may capture video from area 115C, and cameras 120E and 120F may capture video from area 115D.

Alternatively or additionally, camera 120A may capture video from areas 115A, 115B, and 115D, camera 120B may capture video from areas 115A, 115C, and 115D, camera 120C may capture video from areas 115B and 115C, camera 120E may capture video from areas 115A, 115B, and 115D, and camera 120F may capture video from areas 115A, 115C, and 115D. That is, each camera 120 may capture video from one or more areas 115 of environment 110, and each area 115 may be monitored by one or more cameras 120.

In some aspects, the video surveillance system 100 may employ a different quantity of the cameras 120 as those shown in FIG. 1, as well as, environment 110 may be subdivided into a different number of areas as those shown in FIG. 1, without departing from the scope described herein. In other aspects, environment 110 may comprise multiple areas that may not be located within the same environment, such as front door(s) and back door(s).

In other optional or additional aspects, the environment 110 may comprise an access control point 117. The access control point 117 may comprise any device and/or system that may provide access control functionality. That is, the access control point 117 may refer to a device and/or system that may require a person to present identification information in order to obtain permission to enter and/or exit an area, such as, but not limited to, an access-controlled door, a turnstile, an elevator, and an identification checkpoint. In some aspects, the access control point 117 may comprise devices for acquiring identification information from the person attempting to obtain access, such as card readers, key fob readers, biometric readers, and the like. The identification information may be provided to the video surveillance system 100 for identifying one or more persons 150, 160 in the environment 110. The video surveillance system 100 may be configured to deny access to the environment 110 to the one or more persons attempting to enter the environment 110 via the access control point 117 while wearing a mask incorrectly.

The one or more cameras 120 may be digital video cameras such as security cameras. The one or more cameras 120 may provide a constant video feed of one or more of the areas 115. Image quality of one or more video feeds provided by the one or more cameras 120 may be sufficient to determine whether a person appearing in the one or more video feeds is wearing a mask correctly.

The one or more cameras 120 may generally be oriented in a default direction to capture a particular area 115 where activity may be expected, but the one or more of the cameras 120 may be mounted on a gimbal that may allow for rotation and/or panning of the respective camera 120. For example, the video surveillance system 100 may move the camera 120 to maintain a field of view of the camera 120 on the one or more persons 150, 160. In some aspects, the video surveillance system 100 may allow for manual control of the rotation and/or panning of the camera 120.

The cameras 120 may be calibrated with a camera enrollment process of the video surveillance system 100 that uses reference object(s) of a known physical size and a known distance from the respective cameras. For example, the camera enrollment process may use object 123 to calibrate camera 120A. In some aspects, the camera enrollment process may comprise an image processing algorithm that may provide ratios for converting pixel distances of video frames to physical distances in the environment 110. That is, the video surveillance system 100 may utilize these ratios for determining physical distances between objects (e.g., persons 150, 160) based at least on pixel distances between the objects appearing in the video frames. For example, the video surveillance system 100 may utilize these ratios to determine whether social distance constraints are being met. Alternatively or additionally, the ratios may be utilized to determine physical sizes of objects appearing in the video frames. For example, the video surveillance system 100 may utilize these ratios to determine a height and/or width of an object appearing in the video frames.

In some aspects, object 123 may comprise one or more markings or symbols placed on the ground of area 115 at respective locations having known distances from one another. For example, object 123 may comprise one or more known social distancing symbols on the ground such as circles, squares, "X" marks, or other known indicia that are spaced by a known social distancing constraint.

The video surveillance system 100 may comprise a speaker 125 configured to generate an alert that may be audible by the one or more persons 150, 160 located within the environment 110 (e.g., one or more areas 115). In some aspects, the speaker 125 may comprise, or be part of, a public announcement system. The video surveillance system 100 may comprise a display 127 such as a digital signage. The display 127 may be configured to display textual, graphical, and/or video messages generated by the video surveillance system 100. For example, the display 127 may display alerts generated by the video surveillance system 100 indicating that one or more persons 150, 160 in one or more areas 115 are in violation of the mask wearing policy. In some aspects, the alerts may indicate that the one or more persons 150, 160 are denied access to one or more areas 115. Alternatively or additionally, the alerts may indicate remediation steps that may be taken by the one or more persons 150, 160 to comply with the mask wearing policy.

The cameras 120, the speaker 125, and the display 127 may be communicatively coupled with a network 140, such as the Internet. Other networks may also or alternatively be used, including but not limited to private intranets, corporate networks, local area networks ("LAN"), metropolitan area networks ("MAN"), wireless networks, personal networks ("PAN"), and the like.

In some aspects, the video feeds captured by the one or more cameras 120 may be transmitted via the network 140 to a computing device 130, which may implement all or a portion of the functionality described herein. That is, the computing device 130 may be communicatively coupled with the network 140, and, as such, may indirectly receive one or more video feeds from the one or more cameras 120 via the network 140. Alternatively or additionally, the computing device 130 may be communicatively coupled directly (e.g., hard-wired) with the one or more cameras 120. For example, the computing device 130 may receive the one or more video feeds directly from the one or more cameras 120.

The computing device 130 may be any type of known computer, server, or data processing device. For example, the computing device 130 may be any mobile or fixed computer device including but not limited to a computer server, a desktop or laptop or tablet computer, a cellular telephone, a personal digital assistant ("PDA"), a handheld device, any other computer device having wired and/or wireless connection capability with one or more other devices, or any other type of computerized device capable of processing video data captured by the one or more cameras 120. In some aspects, the computing device 130 may be a cloud-based or shared computing structure accessible through the network 140. The computing device 130 may be located in a location remote from the environment 110, or may be integrated as part of the video surveillance system 100.

The computing device 130 may comprise a processor 133 which may be configured to execute or implement software, hardware, and/or firmware modules that perform any functionality described herein. For example, the processor 133 may be configured to execute or implement software, hardware, and/or firmware modules that perform any functionality described herein with reference to a mask detection component 137 or any other component/system/device described herein.

The processor 133 may be a micro-controller, an application-specific integrated circuit ("ASIC"), a digital signal processor ("DSP"), or a field-programmable gate array ("FPGA"), and/or may comprise a single or multiple set of processors or multi-core processors. Moreover, the processor 133 may be implemented as an integrated processing system and/or a distributed processing system. The computing device 130 may further comprise a memory 135, such as for storing local versions of applications being executed by the processor 133, or related instructions, parameters, and the like.

The memory 135 may include a type of non-transitory memory usable by a computer, such as random access memory ("RAM"), read only memory ("ROM"), tapes, magnetic discs, optical discs, solid state drives ("SSDs"), volatile memory, non-volatile memory, and any combination thereof. Alternatively or additionally, the processor 133 and the memory 135 may comprise and execute an operating system executing on the processor 133, one or more applications, display drivers, etc., and/or other components of the computing device 130.

The computing device 130 may comprise a mask detection component 137 configured to monitor video frames of the one or more video feeds from the one or more cameras 120, to detect the one or more persons 150, 160 in the video frames, and to generate an alert in response to determining that the one or more persons 150, 160 are in violation of a mask wearing policy.

The mask wearing policy may indicate one or more characteristics that need to be met in order to comply with the mask wearing policy. In some aspects, the mask wearing policy may indicate that a person's nose and mouth is to be covered by a mask in order for comply with the mask wearing policy. In other aspects, the mask wearing policy may indicate one or more enforcement areas that delineate one or more areas 115 of the environment 110 within which the mask wearing policy is to be enforced. Alternatively or additionally, the mask wearing policy may indicate one or more thresholds, such as occupancy rate thresholds, social distancing constraints, and environmental thresholds (e.g., ambient temperature, ventilation flow rates, wind speed, relative humidity, barometric pressure), as described in further detail below with reference to FIGS. 2-9.

Aspects of the present disclosure may be implemented using hardware, software, or a combination thereof and may be implemented in one or more computer systems or other processing systems. In an aspect of the present disclosure, features are directed toward one or more computer systems capable of carrying out the functionality described herein. An example of such a computer system is shown in FIG. 2.

Figure 2:
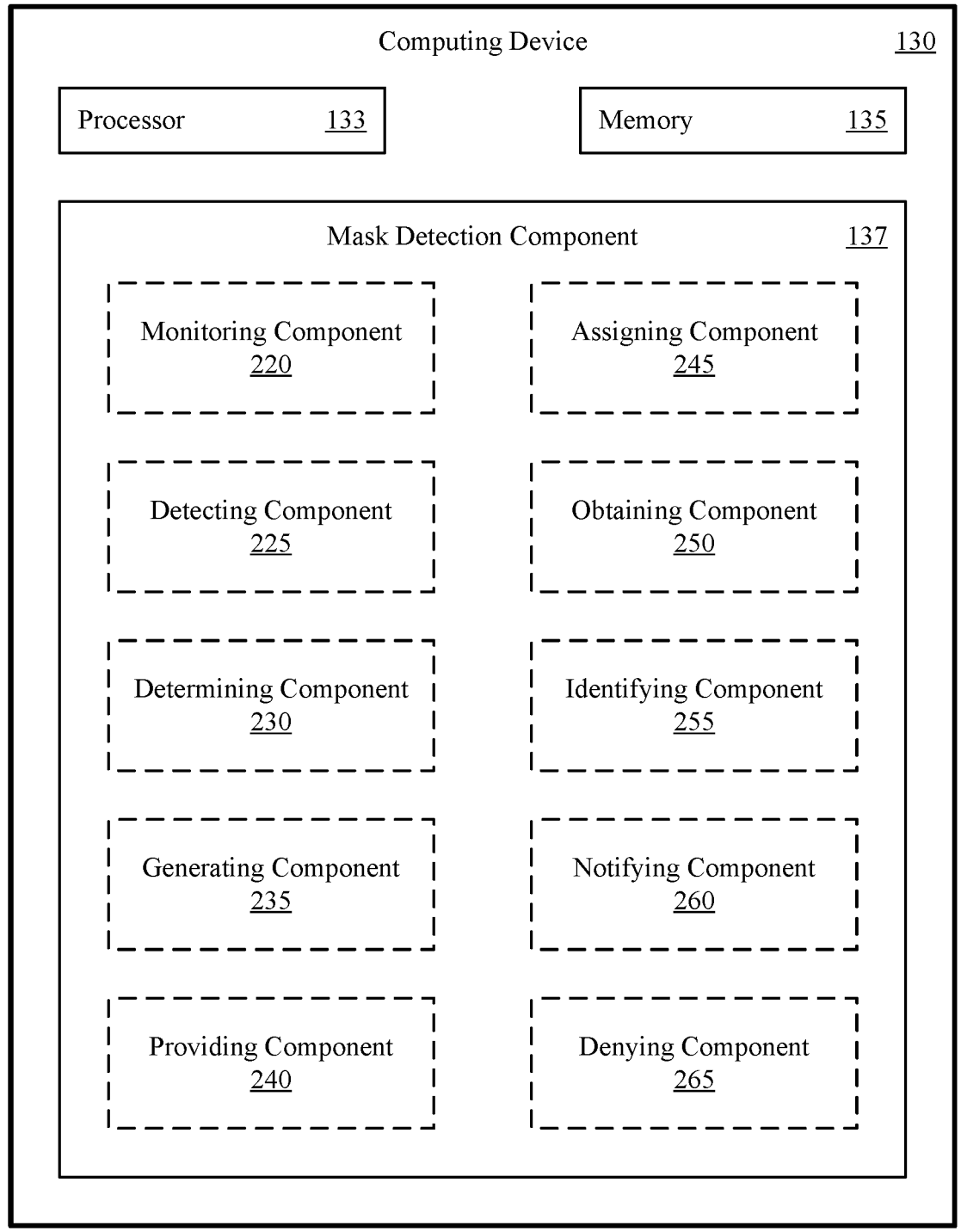
FIG. 2 is a block diagram illustrating an example computing device, in accordance with various aspects of the present disclosure.
Figure 3:
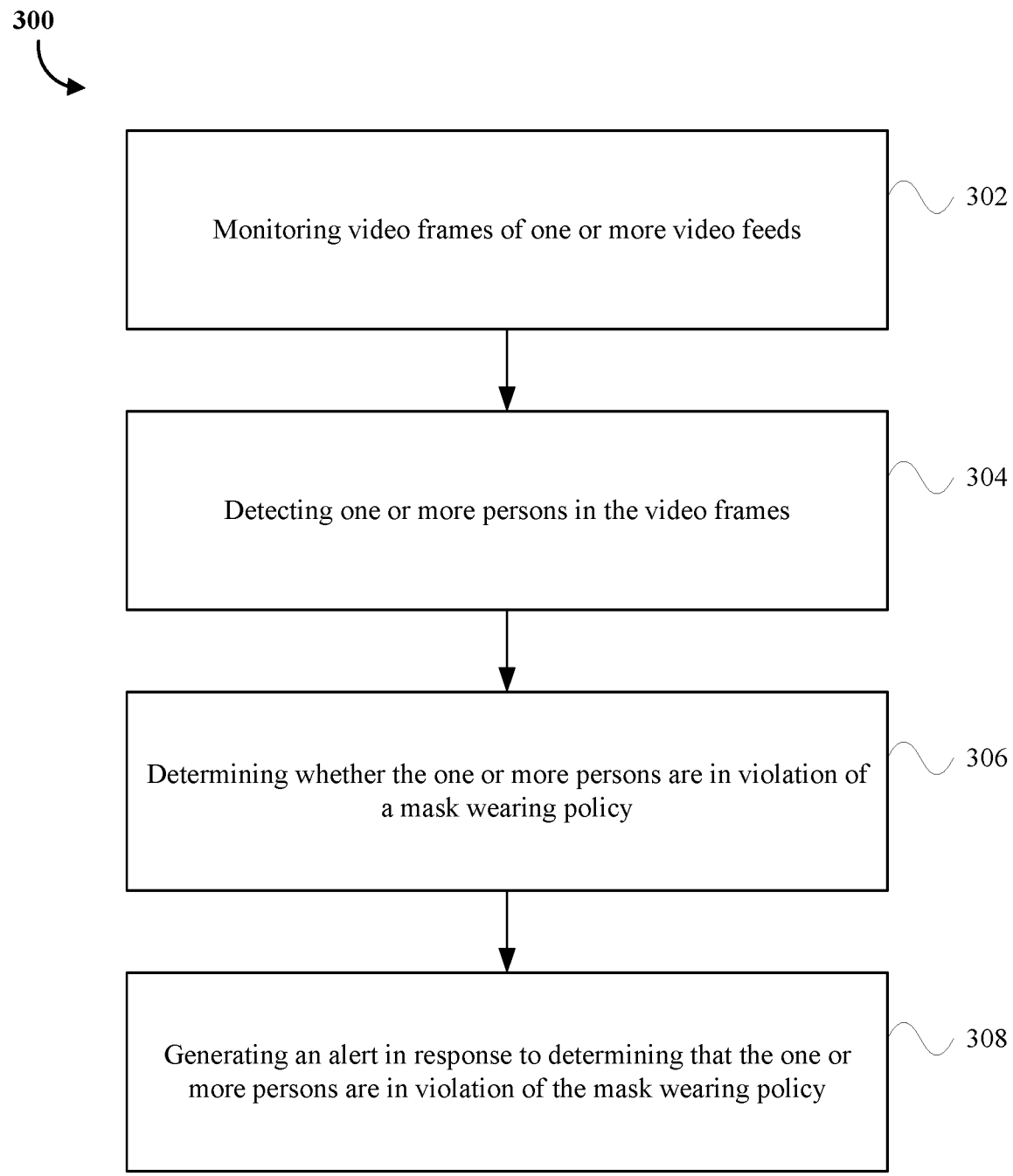
FIG. 3 is a flowchart of a method of detecting incorrect mask usage to be performed by a computing device, in accordance with various aspects of the present disclosure.

FIG. 2 is a block diagram of an example computing device 130 for video surveillance. The computing device 130 depicted in FIG. 2 is similar in many respects to the computing device 130 described above with reference to FIG. 1, and may include additional features not mentioned above. In some aspects, the computing device 130 may comprise a processor 133 configured to execute or implement software, hardware, and/or firmware modules that perform any functionality described herein (e.g., mask detection component 137), a memory 135 configured to store instructions executed the processor 133, and a mask detection component 137 configured to detect incorrect mask usage and to enforce a mask wearing policy.

In some aspects, the computing device 130 may be configured to perform one or more operations described herein in connection with FIG. 1. Alternatively or additionally, the computing device 130 may be configured to perform one or more processes described herein, such as method 300 of FIGS. 3-8. In other aspects, the computing device may include one or more components of the computing device described above in connection with FIG. 1.

In some aspects, the mask detection component 137 may include a set of components, such as a monitoring component 220, a detecting component 225, a determining component 230, a generating component 235, a providing component 240, an assigning component 245, an obtaining component 250, an identifying component 255, a notifying component 260, a denying component 265, or a combination thereof. Alternatively or additionally, the set of components may be separate and distinct from the mask detection component 137. In other aspects, one or more components of the set of components may include or may be implemented within a controller/processor (e.g., processor 133), a memory (e.g., memory 135), or a combination thereof, of the computing device 130 described in FIGS. 1-2. Alternatively or additionally, one or more components of the set of components may be implemented at least in part as software stored in a memory, such as memory 135. For example, a component (or a portion of a component) may be implemented as instructions or code stored in a non-transitory computer-readable medium and executable by a controller or a processor to perform the functions or operations of the component.

The monitoring component 220 may be configured to monitor video frames of one or more video feeds. That is, the monitoring component 220 may monitor the video frames of the one or more video feeds captured by the one or more cameras 120. For example, the monitoring component 220 may receive the one or more video feeds from the one or more cameras 120 monitoring one or more areas 115 of the environment 110. The monitoring component 220 may extract video frames from the one or more video feeds in order to perform mask wearing detection on the video frames, as described herein.

The detecting component 225 may be configured to detect one or more persons 150, 160 in the video frames. That is, the detecting component 225 may analyze the extracted video frames to detect the one or more persons 150, 160 that may appear in the video frames. For example, the detecting component 225 may determine whether objects that appear in the video frames constitute a person 150, 160.

In some optional or additional aspects, the detecting component 225 may access a database or other data store of images and use image processing algorithms, machine learning classifiers, and the like on the video frames to establish what objects in the video frames may likely represent a person 150, 160. In other optional or additional aspects, the detecting component 225 may be provided with base images of areas 115 in which no persons are present. Alternatively or additionally, the detecting component 225 may compare the video frames of the one or more video feeds with the base images having no persons present to determine whether additional objects in the video frames may represent the one or more persons 150, 160. In other optional or additional aspects, the detecting component 225 may place bounding boxes around objects identified in the video frames, and may discard bounding boxes whose dimensions do not meet certain thresholds as likely non-human objects. For example, bounding boxes that identify objects having dimensions smaller or larger than a conventional human size (e.g., a footprint of 2 feet by 2 feet or less, a height of over 7 feet, or a width of over 4 feet) may be discarded. Alternatively or additionally, bounding boxes whose positions change rapidly over subsequent video frames may be discarded. As such, non-human objects, such as birds, dogs, handcarts, suitcases, or cars may not be identified as persons (e.g., 150, 160) by the detecting component 225.

The determining component 230 may be configured to determine whether the one or more persons are in violation of a mask wearing policy. That is, the determining component 230 may determine whether the one or more persons 150, 160, that have been detected by detecting component 225, comply with the mask wearing policy. In some aspects, the determining component 230 may utilize one or more respective facial features of the one or more persons 150, 160 to determine whether each person of the one or more persons 150, 160 is wearing a mask correctly. For example, if or when the respective facial features corresponding to a person (e.g., 150) does not comprise nose and mouth facial features, the determining component 230 may determine that the person is wearing a mask correctly, such as the one or more persons 150. That is, if or when both of a person's nose and mouth are hidden from view, the person is likely to be wearing a mask correctly. For another example, if or when the respective facial features corresponding to another person (e.g., 160) comprise nose or mouth facial features, the determining component 230 may determine that the person is wearing a mask incorrectly, such as the one or more persons 160. That is, if or when a person's nose or mouth are visible, the person is unlikely to be wearing a mask correctly.

In other optional or additional aspects, the determining component 230 may determine a location of a person 150, 160 within environment 110. The determining component 230 may determine that a person 150, 160 is located within a particular area 115 (e.g., 115A-115D) of the environment 110. Alternatively or additionally, the determining component 230 may determine an area (e.g., 115A) delineated by the video frames comprising the one or more persons 150, 160 that are in violation of the mask wearing policy. In other optional or additional aspects, the determining component 230 may determine that a person 150, 160 is located at a particular location within a particular area 115. For example, the determining component 230 may utilize ratios for converting pixel distances of video frames to physical distances in the environment 110 to determine a physical location of a particular person 150, 160 within a particular area 115.

In other optional or additional aspects, the determining component 230 may determine that the location of the person 150, 160 is inside of an enforcement area. For example, the determining component 230 may determine, according to the mask wearing policy, whether the location of the person 150, 160 is inside or outside the enforcement area. In some aspects, the mask wearing policy may indicate that one or more areas 115 (e.g., 115A-115D) of the environment 110 comprise at least a portion of an enforcement area. That is, the mask wearing policy may indicate that the mask wearing policy is to be enforced in the enforcement area delineated by the one or more areas 115. For example, if or when the mask wearing policy indicates that the area 115A is inside the enforcement area, the determining component 230 may determine that the one or more persons 160 appearing in the area 115A may be in violation of the mask wearing policy. Alternatively or additionally, the mask wearing policy may indicate that other areas 115 (e.g., 115B-115D) of the environment 110 are outside of the enforcement area. That is, the mask wearing policy may indicate that the mask wearing policy is not to be enforced in the other areas 115. For example, if or when the mask wearing policy indicates that the area 115B is outside the enforcement area, the determining component 230 may determine that the one or more persons 160 appearing in the area 115B may not be in violation of the mask wearing policy.

In other optional or additional aspects, the mask wearing policy may comprise a maximum occupancy rate threshold that may indicate a maximum quantity of persons 150, 160 that may simultaneously occupy an area 115 while adhering to social distancing constraints, for example. Alternatively or additionally, the maximum occupancy rate threshold may be adjusted based on safety and health restrictions. For example, the maximum occupancy rate threshold may be lowered by health restrictions related to controlling the spread of an infectious disease (e.g., COVID-19). In another example, the maximum occupancy rate threshold may be increased if or when the health restrictions are lifted.

In these optional or additional aspects, the determining component 230 may determine the occupancy rate of an area delineated by the video frames. That is, the determining component 230 may determine an occupancy rate for a particular area (e.g., area 115A-115D) based on a quantity of the one or more persons 150, 160 appearing in video frames corresponding to the particular area. The determining component 230 may be configured to determine that the persons 150, 160 appearing in the particular area are in violation of the mask wearing policy based at least on a determination whether the occupancy rate of the particular area exceeds the maximum occupancy rate threshold. For example, the determining component 230 may determine that the occupancy rate of an area 115D (e.g., 15 persons) is greater than the maximum occupancy rate threshold for the area 115D (e.g., 10 persons), and, as a result, may determine that the persons 150 in the area 115D are in violation of the mask wearing policy. Alternatively or additionally, the determining component 230 may determine that the occupancy rate is less than or equal to the maximum occupancy rate threshold, and, as a result, may determine whether each person of the one or more persons 150 appearing in the area 115D are wearing a mask correctly.

In other optional or additional aspects, the mask wearing policy may comprise a minimum occupancy rate threshold that may indicate a minimum quantity of persons 150, 160 that may simultaneously occupy an area 115 for the mask wearing policy to be enforced. For example, the minimum occupancy rate threshold may be set to one person if or when the area 115 comprises a private office, such that one person not wearing a mask may work alone in the private office without triggering a mask wearing policy violation.

In these optional or additional aspects, the determining component 230 may determine that the occupancy rate of an area 115C (e.g., 2 persons) is greater than the minimum occupancy rate threshold for the area 115C (e.g., 1 person), and, as a result, may determine whether the one or more persons 150, 160 appearing in the area 115D are correctly wearing a mask. Alternatively or additionally, the determining component 230 may determine that the occupancy rate of an area 115B (e.g., 1 person) does not exceed the minimum occupancy rate threshold for the area 115B, and, as a result, may determine no violations to the mask wearing policy from the area 115B.

The generating component 235 may be configured to generate an alert in response to the determining component 230 determining that the one or more persons 150, 160 are in violation of the mask wearing policy. In some aspects, the generating component 235 may cause the speaker 125 to generate an audible alarm and/or a spoken message that may be audible to the one or more persons 150, 160 that are in violation of the mask wearing policy. That is, the alarm may be audible within the area delineated by the video frames comprising the one or more persons 150, 160 that are in violation of the mask wearing policy.

Alternatively or additionally, the generating component 235 may cause the display 127 to display textual, graphical, and/or video messages that may be visible by the one or more persons 150, 160 that are in violation of the mask wearing policy. That is, the displayed message may be visible within the area delineated by the video frames comprising the one or more persons 150, 160 that are in violation of the mask wearing policy. In some aspects, the generating component 235 may cause the display 127 to display alerts indicating that the one or more persons 150, 160 are denied access to one or more areas 115. Alternatively or additionally, the displayed alerts may indicate remediation steps that may be taken by the one or more persons 150, 160 to comply with the mask wearing policy.

In other optional or additional aspects, the generating component 235 may transmit a notification indicating that a mask wearing policy violation has been determined. For example, the generating component 235 may transmit a message (e.g., email, short message service ("SMS"), automated voice call) to one or more recipients comprising an indication that one or more persons 150, 160 are in violation of the mask wearing policy. In some aspects, the notification may be transmitted to a third-party local to the environment 110, such as security personnel, building management personnel, and the like. Alternatively or additionally, the notification may be transmitted to a third-party remote to the environment 110, such as law enforcement, civil health authorities, and the like. In other optional or additional aspects, the notification may be transmitted to one or more persons associated with the area delineated by the video frames comprising the one or more persons 150, 160 that are in violation of the mask wearing policy. For example, if or when the environment 110 comprises an office building, the notification may be transmitted to personnel assigned to work in the area delineated by the video frames comprising the one or more persons 150, 160 that are in violation of the mask wearing policy.

In other optional or additional aspects, the generating component 235 may be configured to provide a video clip of the video frames comprising the one or more persons 150, 160 that are in violation of the mask wearing policy. For example, the message generated by the generating component 235 and displayed by the display 127 may comprise the video clip of the video frames comprising the one or more persons 150, 160 that are in violation of the mask wearing policy. Alternatively or additionally, the message (e.g., email, SMS, automated voice call) transmitted by the generating component may comprise the video clip of the video frames comprising the one or more persons 150, 160 that are in violation of the mask wearing policy.

The providing component 240 may be configured to provide the video frames to a facial feature detection algorithm. That is, the providing component 240 may provide to the facial feature detection algorithm the video frames extracted by the monitoring component 220. In some aspects, the providing component 240 may provide identification information corresponding to the one or more persons 150, 160 appearing in the video frames to the facial feature detection algorithm. For example, the identification information may comprise identifying information such as name, address, employer, access card identification number, key fob identification number, biometric information, and the like. The facial feature detection algorithm may be configured to detect respective facial features of the one or more persons. For example, the facial feature detection algorithm may comprise a machine learning classifier having been trained to extract facial features (e.g., eyes, noses, mouths, ears) from video frames in which one or more persons appear. Alternatively or additionally, the facial feature detection algorithm may compare properties of base images of facial features with the properties of the video frames, such as color (e.g., hue, lightness, or saturation), object shape (e.g., shape of face), object size (e.g., of person), and/or other conventional image comparison attributes.

The assigning component 245 may be configured to assign a mask wearing violation to one or more persons 150, 160 in response to determining that at least one characteristic of the mask wearing policy is not met. That is, the assigning component 245 may generate a mask wearing policy violation and/or an alert in response to the determining component 230 having determined that the one or more persons 150, 160 are wearing a mask incorrectly and/or at least one other characteristic of the mask wearing policy is not met. For example, the assigning component 245 may generate a mask wearing policy violation if or when the determining component 230 has determined that the one or more persons 150, 160 are wearing a mask incorrectly and that one other characteristic of the mask wearing policy is not met. Alternatively or additionally, the assigning component 245 may cause the generating component 235 to generate an alert in response to generating the mask wearing policy violation.

In some aspects, the assigning component 245 may assign a mask wearing policy violation based at least on a determination that the one or more persons 150, 160 are wearing a mask incorrectly while located inside of the enforcement area. In other optional or additional aspects, the assigning component 245 may assign a mask wearing policy violation based at least on a determination that the occupancy rate of the area delineated by the video frames exceeds the maximum occupancy rate threshold.

In other optional or additional aspects, the mask wearing policy may comprise one or more environmental thresholds. For example, the mask wearing policy may indicate one or more environmental thresholds corresponding to environmental measurements of environment 110, such as ambient temperature, ventilation flow rates, wind speed, relative humidity, barometric pressure, and the like. In these optional or additional aspects, the assign component 245 may be configured to assign a mask wearing policy violation based on a determination that the one or more persons 150, 160 are wearing a mask incorrectly and that the one or more environmental thresholds are not met. For example, if or when the mask wearing policy indicates a humidity threshold, the assigning component 245 may be configured to assign a mask wearing policy violation if or when the one or more persons 150, 160 are wearing a mask incorrectly and the humidity level of environment 110 (or of one or more areas 115) does not meet the humidity threshold.

In other optional or additional aspects, the assigning component 245 may be configured to assign a mask wearing policy violation if or when a social distancing constraint is not met by the one or more persons 150, 160 wearing a mask incorrectly. For example, the mask wearing policy may indicate a minimum social distancing constraint (e.g., 6 feet)

and the assigning component 245 may assign a mask wearing violation if or when distances between each person wearing a mask incorrectly and their surrounding persons is less than the minimum social distancing constraint.

The obtaining component 250 may be configured to obtain identification information of a person of interest. For example, the identification information may comprise at least one image of the person of interest. Alternatively or additionally, the identification information may comprise a database record comprising information with which a person 150, 160 detected by the detecting component 225 may be identified, such as facial features. In some aspects, the identification information may comprise other identifying information such as name, address, employer, access card identification number, key fob identification number, biometric information, and the like.

The identifying component 255 may be configured to identify a first person of the one or more persons as the person of interest. That is, the identifying component 255 may compare the at least one image of the person of interest with the video frames in which the one or more persons appear in order to determine whether the person of interest appears in the video frames. In some aspects, the identifying component 255 may use facial recognition techniques to identify the person of interest. Alternatively or additionally, the identifying component 255 may utilize a facial recognition algorithm to compare facial features of the one or more persons that appear in the video frames with the identifying information of the person of interest.

The notifying component 260 may be configured to notify the person of interest identified by the identifying component 255 and determined by the determining component 230 that they are in violation of the mask wearing policy. In some aspects, the notifying component 260 may cause the speaker 125 to generate an audible alarm and/or a spoken message that may be audible by the person of interest. In other optional or additional aspects, the notifying component 260 may cause the display 127 to display textual, graphical, and/or video messages that may be visible by the person of interest. In other optional or additional aspects, the notifying component 260 may transmit a message (e.g., email, SMS, automated voice call) to the person of interest comprising an indication that the person of interest is in violation of the mask wearing policy.

The denying component 265 may be configured to deny access to the one or more persons 150, 160 that are in violation of the mask wearing policy. That is, the denying component 265 may cause the access control point 117 to deny access to the environment 110 to the one or more persons 150, 160 that the determining component 230 has determined are in violation of the mask wearing policy.

Referring to FIGS. 3-8, in operation, computing device 130 may perform a method 300 of detecting incorrect mask usage. The method 300 may be performed by the computing device 130 (which may include the memory 135 and which may be the entire computing device 130 and/or one or more components of the computing device 130, such as mask detection component 137, processor 133, and/or memory 135.) The method 300 may be performed by the mask detection component 137 in communication with the one or more cameras 120.

At block 302, the method 300 includes monitoring video frames of one or more video feeds. For example, in an aspect, the computing device 130, the processor 133, the memory 135, the mask detection component 137, and/or the monitoring component 220 may be configured to or may comprise means for monitoring the video frames of the one or more video feeds.

For example, the monitoring at block 302 may include receiving the one or more video feeds from the one or more cameras 120 monitoring one or more areas 115 of the environment 110. In some aspects, the monitoring at block 302 may further include extracting video frames from the one or more video feeds in order to perform mask wearing detection analysis on the video frames Further, for example, the monitoring at block 302 may be performed to gather video frames from the one or more video feeds that may be analyzed in order to detect mask wearing policy violations by the one or more persons (e.g., 160) located within the environment 110.

At block 304, the method 300 includes detecting one or more persons in the video frames. For example, in an aspect, the computing device 130, the processor 133, the memory 135, the mask detection component 137, and/or the detecting component 225 may be configured to or may comprise means for detecting one or more persons in the video frames.

For example, the detecting at block 304 may include classifying objects that appear in the video frames and determining whether the objects constitute a person 150, 160. In some aspects, the detecting at block 304 may include accessing a database or other data store of images and using image processing algorithms, machine learning classifiers, and the like on the video frames to establish which objects in the video frames may likely represent a person 150, 160.

In other optional or additional aspects, the detecting at block 304 may include comparing the video frames of the one or more video feeds with base images having no persons present to determine whether additional objects in the video frames may represent one or more persons 150, 160. In other optional or additional aspects, the detecting at block 304 may include placing bounding boxes around objects identified in the video frames, and discarding bounding boxes whose dimensions do not meet certain thresholds as likely non-human objects. Alternatively or additionally, bounding boxes whose positions change rapidly over subsequent video frames may be discarded. As such, non-human objects, such as birds, dogs, handcarts, suitcases, or cars may not be identified as persons (e.g., 150, 160).

Further, for example, the detecting at block 304 may be performed to detect and classify human objects in the video frames as one or more persons 150, 160 and to discard non-human objects.

At block 306, the method 300 includes determining whether the one or more persons are in violation of a mask wearing policy. For example, in an aspect, the computing device 130, the processor 133, the memory 135, the mask detection component 137, and/or the determining component 230 may be configured to or may comprise means for determining whether the one or more persons 150, 160 are in violation of a mask wearing policy.

For example, the determining at block 306 may include determining that the one or more persons 150 are wearing a mask correctly. Alternatively or additionally, the determining at block 306 may include determining that the one or more persons 160 are wearing a mask incorrectly and/or not wearing a mask.

In some aspects, the determining at block 306 may include determining a location of a person 150, 160 within environment 110. The location may indicate that a person 150, 160 is located within a particular area 115 (e.g., 115A-115D) of the environment 110. Alternatively or additionally, the location may indicate a particular location within a particular area 115. For example, the determining at block 306 may include utilizing ratios for converting pixel distances of video frames to physical distances in the environment 110 to determine a physical location of a particular person 150, 160 within a particular area 115.

In other optional or additional aspects, the determining at block 306 may include determining an area (e.g., 115A) delineated by the video frames comprising the one or more persons 150, 160 that are in violation of the mask wearing policy.

In other optional or additional aspects, the determining at block 306 may include determining an occupancy rate for a particular area (e.g., area 115A-115D) based on a quantity of the one or more persons 150, 160 appearing in video frames corresponding to the particular area. The determining at block 306 may further include determining that the persons 150, 160 appearing in the particular area are in violation of the mask wearing policy based at least on a determination whether the occupancy rate of the particular area exceeds an occupancy rate threshold. For example, determining that the occupancy rate of area 115D (e.g., 15 persons) is greater than the occupancy rate threshold for the area 115D (e.g., 10 persons) may result in a determination that the persons 150 in the area 115D are in violation of the mask wearing policy. Alternatively or additionally, determining that the occupancy rate is less than or equal to the occupancy rate threshold may result in a determination whether each person of the one or more persons 150, 160 appearing in the area 115D are wearing a mask correctly. The occupancy rate threshold may be indicated by the mask wearing policy.

Further, for example, the determining at block 306 may be performed to automatically determine that the one or more persons 160 in environment 110 are wearing a mask incorrectly or are not wearing a mask. Such a determination may allow the video surveillance system 100 to automatically enforce mask wearing policies without the need for time and labor intensive manual processes. Thus, aspects presented herein may increase accuracy and effectiveness of the enforcement of mask wearing policies over conventional video surveillance systems.

At block 308, the method 300 includes generating an alert in response to determining that the one or more persons are in violation of the mask wearing policy. For example, in an aspect, the computing device 130, the processor 133, the memory 135, the mask detection component 137, and/or the generating component 235 may be configured to or may comprise means for generating an alert in response to determining that the one or more persons 150, 160 are in violation of the mask wearing policy.

For example, the generating at block 308 may include causing the speaker 125 to generate an audible alarm and/or a spoken message that may be audible to the one or more persons 150, 160 that are in violation of the mask wearing policy. The alarm may be audible within the area delineated by the video frames comprising the one or more persons 150, 160 that are in violation of the mask wearing policy.

In some aspects, the generating at block 308 may include causing the display 127 to display textual, graphical, and/or video messages that may be visible by the one or more persons 150, 160 that are in violation of the mask wearing policy. The displayed message may be visible within the area delineated by the video frames comprising the one or more persons 150, 160 that are in violation of the mask wearing policy. In other optional or additional aspects, the generating at block 308 may include causing the display 127 to display alerts indicating that the one or more persons 150, 160 are denied access to one or more areas 115. Alternatively or additionally, the displayed alerts may indicate remediation steps that may be taken by the one or more persons 150, 160 to comply with the mask wearing policy.

In other optional or additional aspects, the generating at block 308 may include transmitting a notification indicating that a mask wearing policy violation has been determined. In these optional or additional aspects, the generating at block 308 may include transmitting a message (e.g., email, SMS, automated voice call) to one or more recipients comprising an indication that one or more persons 150, 160 are in violation of the mask wearing policy. In some aspects, the notification may be transmitted to a third-party local to the environment 110, such as security personnel, building management personnel, and the like. Alternatively or additionally, the notification may be transmitted to a third-party remote to the environment 110, such as law enforcement, civil health authorities, and the like. In other optional or additional aspects, the notification may be transmitted to the one or more persons associated with the area delineated by the video frames comprising the one or more persons 150, 160 that are in violation of the mask wearing policy.

In other optional or additional aspects, the generating at block 308 may include providing a video clip of the video frames comprising the one or more persons 150, 160 that are in violation of the mask wearing policy. In these optional or additional aspects, the message displayed by the display 127 may comprise the video clip of the video frames comprising the one or more persons that are in violation of the mask wearing policy. Alternatively or additionally, the transmitted message (e.g., email, SMS, automated voice call) may comprise the video clip of the video frames comprising the one or more persons 150, 160 that are in violation of the mask wearing policy.

In other optional or additional aspects, the generating at block 308 may include determining an area delineated by the video frames comprises the one or more persons in violation of the mask wearing policy, and notifying people located in the area of a mask wearing policy violation.

Further, for example, the generating at block 308 may be performed to notify the appropriate persons and/or personnel of the mask wearing policy violation determined by the video surveillance system 100.

Figure 4:
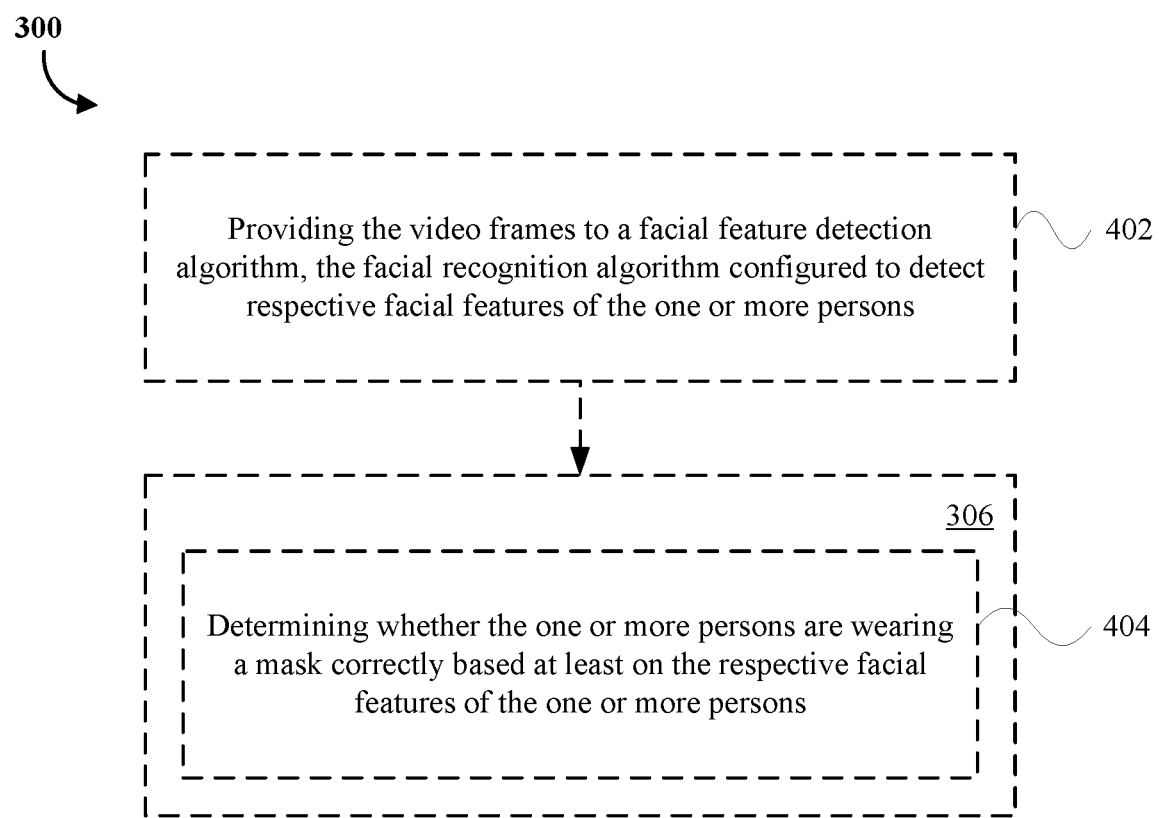
FIG. 4 is a flowchart of first additional or optional steps of the method of detecting incorrect mask usage to be performed by the computing device, in accordance with various aspects of the present disclosure.
Figure 5:
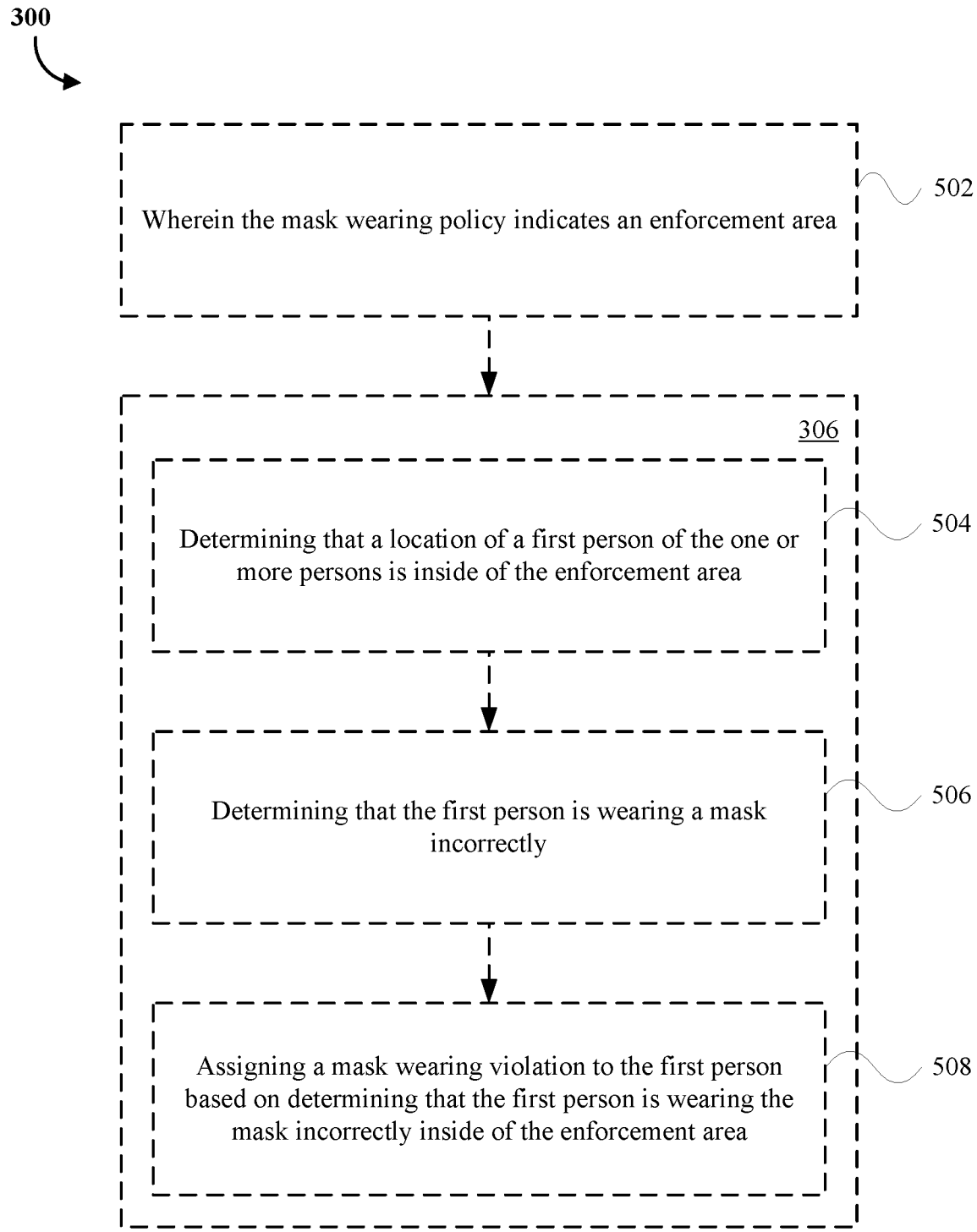
FIG. 5 is a flowchart of second additional or optional steps of the method of detecting incorrect mask usage to be performed by the computing device, in accordance with various aspects of the present disclosure.

Referring to FIG. 4, in an optional or additional aspect that may be combined with any other aspect, in block 402, the method 300 may further include providing the one or more video frames to a facial feature detection algorithm, the facial feature detection algorithm being configured to detect respective facial features of the one or more persons. For example, in an aspect, the computing device 130, the processor 133, the memory 135, the mask detection component 137, and/or the providing component 240 may be configured to or may comprise means for providing the one or more video frames to a facial feature detection algorithm, the facial recognition feature detection being configured to detect respective facial features of the one or more persons.

For example, the providing at block 402 may include providing to the facial feature detection algorithm the one or more video frames extracted from the one or more video feeds. In some aspects, the providing at block 402 may include providing identification information corresponding to the one or more persons 150, 160 appearing in the video frames to the facial feature detection algorithm. In some aspects, the identification information may comprise identifying information such as name, address, employer, access card identification number, key fob identification number, biometric information, and the like. The facial feature detection algorithm may be configured to detect respective facial features of the one or more persons. For example, the facial feature detection algorithm may comprise a machine learning classifier having been trained to extract facial features (e.g., eyes, noses, mouths, ears) from video frames in which one or more persons appear. Alternatively or additionally, the facial feature detection algorithm may compare properties of base images of facial features with the properties of the video frames, such as color (e.g., hue, lightness, or saturation), object shape (e.g., shape of face), object size (e.g., of person), and/or other conventional image comparison attributes. For example, the base images may comprise a database of photos of people that work in a building and/or company.

Further, for example, the providing at block 402 may be performed to obtain respective facial features of the persons 150, 160 that may be used to determine whether each person 150, 160 is wearing a mask correctly.

In this optional or additional aspect, at block 404, the determining at block 306 of whether the one or more persons are in violation of the mask wearing policy may include determining whether the one or more persons are wearing a mask correctly based at least on the respective facial features of the one or more persons. For example, in an aspect, the computing device 130, the processor 133, the memory 135, the mask detection component 137, and/or the determining component 230 may be configured to or may comprise means for determining whether the one or more persons are wearing a mask correctly based at least on the respective facial features of the one or more persons.

For example, the determining at block 404 may include determining that a person is wearing a mask correctly, such as person 150, if or when the respective facial features corresponding to the person do not comprise nose and mouth facial features. The determining at block 404 may further include determining that a person is wearing a mask incorrectly, such as person 160, if or when the respective facial features corresponding to the person comprise nose or mouth facial features.

Further, for example, the determining at block 404 may be performed to automatically determine that the one or more persons 160 in environment 110 are wearing a mask incorrectly or are not wearing a mask. Such a determination may allow the video surveillance system 100 to automatically enforce mask wearing policies without the need for costly and labor intensive manual processes. Thus, aspects presented herein may increase accuracy and effectiveness of the enforcement of mask wearing policies over conventional video surveillance systems Referring to FIG. 5, in an optional or additional aspect that may be combined with any other aspect, at block 502, the method 300 may further include wherein the mask wearing policy indicates an enforcement area. For example, in an aspect, the computing device 130, the processor 133, the memory 135, the mask detection component 137, and/or the determining component 230 may be configured to or may comprise means for the mask wearing policy indicating the enforcement area.

For example, at block 502, the mask wearing policy may indicate that one or more areas 115 (e.g., 115A-115D) of the environment 110 comprise at least a portion of an enforcement area. That is, the mask wearing policy may indicate that the mask wearing policy is to be enforced in the enforcement area delineated by the one or more areas 115. Alternatively or additionally, the mask wearing policy may indicate that other areas 115 (e.g., 115A-115D) of the environment 110 are outside of the enforcement area. That is, the mask wearing policy may indicate that the mask wearing policy is not to be enforced in the other areas 115.

Further, for example, the mask wearing policy at block 502 may indicate the enforcement area to designate one or more areas 115 in environment 110 in which the mask wearing policy is enforced and/or other areas 115 in which the mask wearing policy is not enforced.

In this optional or additional aspect, at block 504, the determining at block 306 of whether the one or more persons are in violation of the mask wearing policy may include determining that a location of a first person of the one or more persons is inside of the enforcement area. For example, in an aspect the computing device 130, the processor 133, the memory 135, the mask detection component 137, and/or the determining component 230 may be configured to or may comprise means for determining that the location of the first person of the one or more persons 150, 160 is inside of the enforcement area.

For example, at block 504, the determining may include determining that the location of the person 150, 160 is inside of the enforcement area. For example, if or when the mask wearing policy indicates that the area 115A is inside the enforcement area, the determining at block 504 may include determining whether each person of the persons 150, 160 appearing in the area 115A are in violation of the mask wearing policy.

Further, for example, the determining at block 504 may be performed to determine whether or not to enforce the mask wearing policy on the persons 150, 160 based at least on their respective locations inside or outside of the enforcement area.

In this optional or additional aspect, at block 506, the determining at block 306 of whether the one or more persons are in violation of the mask wearing policy may include determining that the first person is wearing a mask incorrectly. For example, in an aspect, the computing device 130, the processor 133, the memory 135, the mask detection component 137, and/or the determining component 230 may be configured to or may comprise means for determining that the first person is wearing a mask incorrectly.

For example, at block 506, the determining may include determining whether each person of the one or more persons 150, 160 is wearing a mask incorrectly. In some aspects, if or when the respective facial features corresponding to a person (e.g., 150) does not comprise nose and mouth facial features, the determining component 230 may determine that the person is wearing a mask correctly, such as the one or more persons 150. That is, if or when both of a person's nose and mouth are hidden from view, the person is likely to be wearing a mask correctly. In other optional or additional aspects, if or when the respective facial features corresponding to another person (e.g., 160) comprise nose or mouth facial features, the determining component 230 may determine that the person is wearing a mask incorrectly, such as the one or more persons 160. That is, if or when a person's nose or mouth are visible, the person is unlikely to be wearing a mask correctly.

Further, for example, the determining at block 506 may be performed to automatically determine that the one or more persons 160 in environment 110 are wearing a mask incorrectly or are not wearing a mask. Such a determination may allow the video surveillance system 100 to automatically enforce mask wearing policies without the need for time and labor intensive manual processes. Thus, aspects presented herein may increase accuracy and effectiveness of the enforcement of mask wearing policies over conventional video surveillance systems.

In this optional or additional aspect, at block 508, the determining at block 306 of whether the one or more persons are in violation of the mask wearing policy may include assigning a mask wearing violation to the first person based on determining that the first person is wearing the mask incorrectly inside of the enforcement area. For example, in an aspect, the computing device 130, the processor 133, the memory 135, the mask detection component 137, and/or the assigning component 245 may be configured to or may comprise means for assigning a mask wearing violation to the first person based on determining that the first person is wearing the mask incorrectly inside of the enforcement area.

For example, at block 508, the assigning may include generating a mask wearing policy violation in response to determining that the first person is wearing the mask incorrectly and that the location of the first person is inside of the enforcement area. In some aspects, the assigning at block 508 may further include causing the generating component 235 to generate an alert in response to generating the mask wearing policy violation.

Further, for example, the assigning at block 508 may be performed to enforce the mask wearing policy in the enforcement areas indicated by the mask wearing policy. Alternatively or additionally, the assigning at block 508 may be performed to prevent mask wearing policy enforcement in areas outside of the enforcement areas indicated by the mask wearing policy. As such, the mask wearing policy may indicate areas in which persons may not be required to wear a mask (e.g., a private office).

Figure 6:
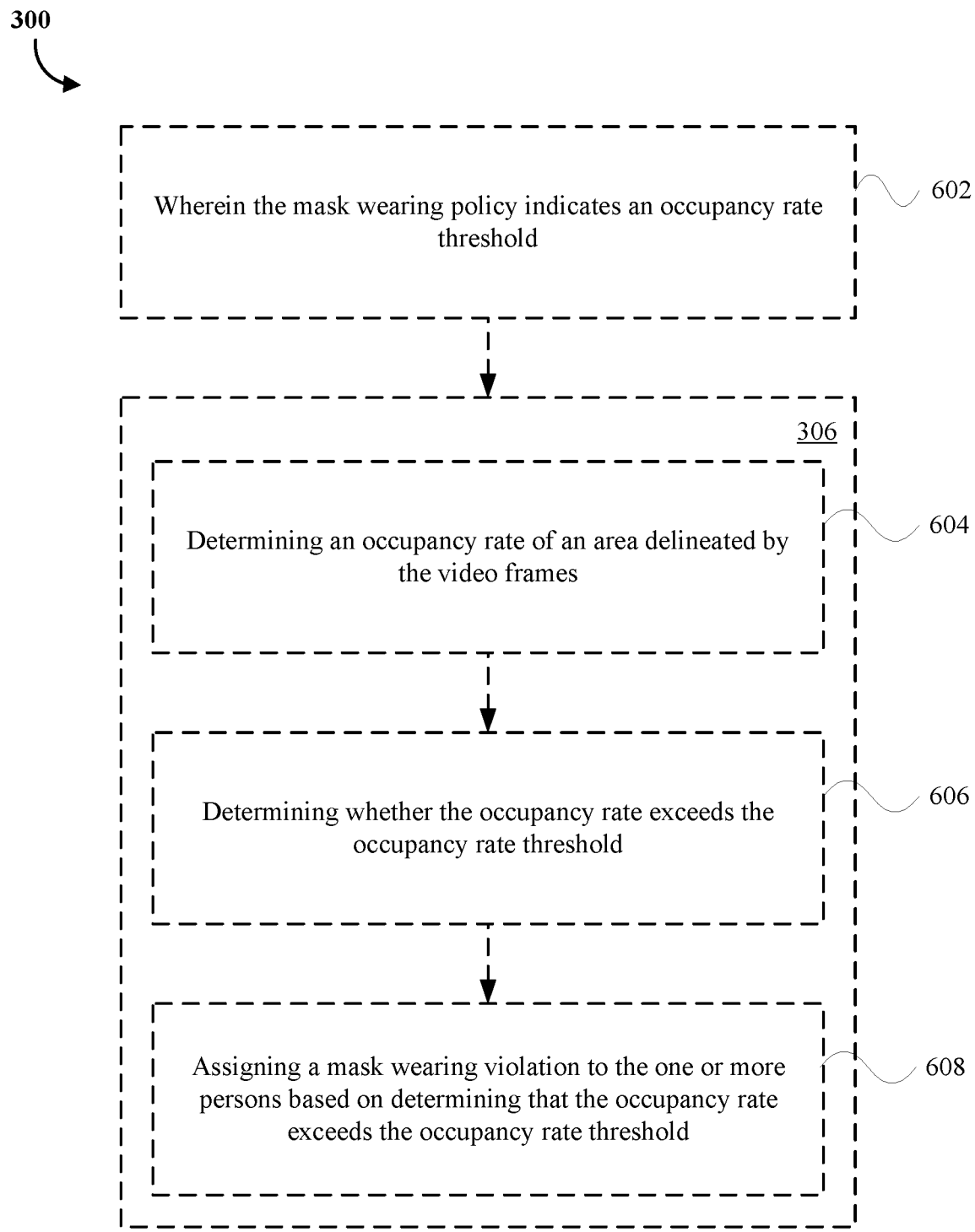
FIG. 6 is a flowchart of third additional or optional steps of the method of detecting incorrect mask usage to be performed by the computing device, in accordance with various aspects of the present disclosure.

Referring to FIG. 6, in an optional or additional aspect that may be combined with any other aspect, at block 602, the method 300 may further include wherein the mask wearing policy indicates an occupancy rate threshold. For example, in an aspect, the computing device 130, the processor 133, the memory 135, the mask detection component 137, and/or the determining component 230 may be configured to or may comprise means for the mask wearing policy indicating the occupancy rate threshold.

In this optional or additional aspect, at block 604, the determining at block 306 of whether the one or more persons are in violation of the mask wearing policy may include determining an occupancy rate of an area delineated by the video frames. For example, in an aspect the computing device 130, the processor 133, the memory 135, the mask detection component 137, and/or the determining component 230 may be configured to or may comprise means for determining an occupancy rate of an area delineated by the video frames.

For example, at block 604, the determining may include determining an occupancy rate for a particular area (e.g., area 115A-115D) based on a quantity of the one or more persons 150, 160 appearing in video frames corresponding to the particular area.

Further, for example, the determining at block 604 may be performed to determine the occupancy rate for the particular area. And, as such, allow for a determination of whether the occupancy rate for the particular area exceeds the occupancy rate threshold.

In this optional or additional aspect, at block 606, the determining at block 306 of whether the one or more persons are in violation of the mask wearing policy may include determining whether the occupancy rate exceeds the occupancy rate threshold. For example, in an aspect the computing device 130, the processor 133, the memory 135, the mask detection component 137, and/or the determining component 230 may be configured to or may comprise means for determining whether the occupancy rate exceeds the occupancy rate threshold.

For example, at block 606, the determining may include comparing the occupancy rate of the particular area with the occupancy rate threshold. In some aspects, the determining at block 606 may include determining that the occupancy rate of area 115D (e.g., 15 persons) is greater than the occupancy rate threshold for area 115 (e.g., 10 persons), and determining that the persons 150 in area 115D are in violation of the mask wearing policy. Alternatively or additionally, the determining at block 606 may include determining that the occupancy rate is less than or equal to the occupancy rate threshold, and, as a result, determining whether each person of the one or more persons 150 appearing in the area 115D are wearing a mask correctly.

Further, for example, the determining at block 606 may be performed to determine whether the persons 150, 160 appearing in the particular area are in violation of the mask wearing policy based at least on a determination of whether the occupancy rate of the particular area exceeds an occupancy rate threshold.

In this optional or additional aspect, at block 608, the determining at block 306 of whether the one or more persons are in violation of the mask wearing policy may include assigning a mask wearing violation to the one or more persons based on determining that the occupancy rate exceeds the occupancy rate threshold. For example, in an aspect the computing device 130, the processor 133, the memory 135, the mask detection component 137, and/or the assigning component 245 may be configured to or may comprise means for assigning a mask wearing violation to the one or more persons based on determining that the occupancy rate exceeds the occupancy rate threshold.

For example, at block 608, the assigning may include generating a mask wearing policy violation based on determining that the occupancy rate of the area delineated by the video frames exceeds the occupancy rate threshold. In some aspects, the assigning at block 608 may further include causing the generating component 235 to generate an alert in response to generating the mask wearing policy violation.

Further, for example, the assigning at block 608 may be performed to enforce a occupancy rate threshold indicated by the mask wearing policy. As such, the video surveillance system 100 may generate an alert if or when an occupancy rate exceeds a level that is considered safe by safety and health restrictions.

Figure 7:
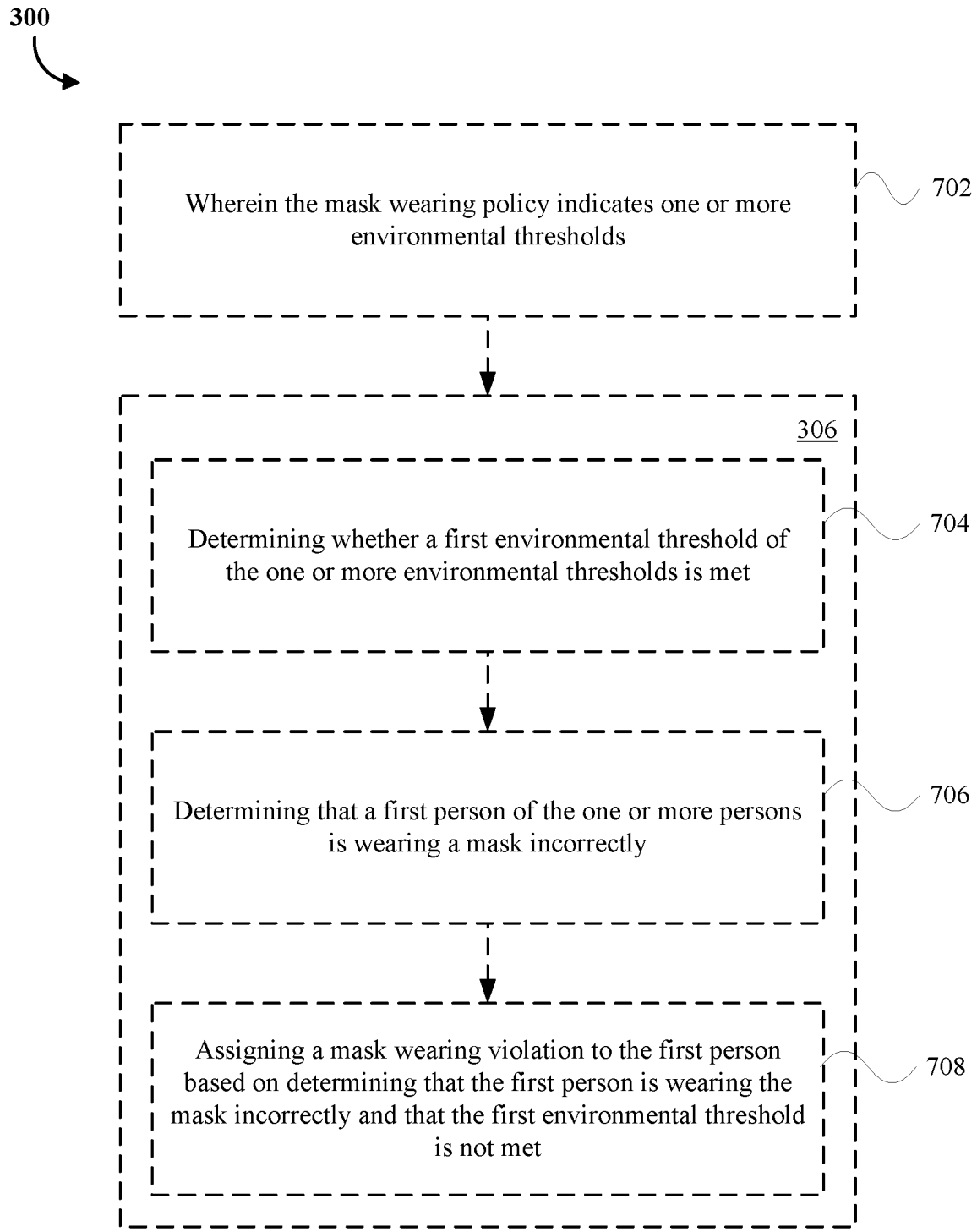
FIG. 7 is a flowchart of fourth additional or optional steps of the method of detecting incorrect mask usage to be performed by the computing device, in accordance with various aspects of the present disclosure.

Referring to FIG. 7, in an optional or additional aspect that may be combined with any other aspect, at block 702, the method 300 may further include wherein the mask wearing policy indicates one or more environmental thresholds. For example, in an aspect, the computing device 130, the processor 133, the memory 135, the mask detection component 137, and/or the determining component 230 may be configured to or may comprise means for the mask wearing policy indicates the one or more environmental thresholds.

For example, at block 702, the mask wearing policy may comprise one or more environmental thresholds. For example, the mask wearing policy may indicate one or more environmental thresholds corresponding to environmental measurements of environment 110, such as ambient temperature, ventilation flow rates, wind speed, relative humidity, barometric pressure, and the like.

Further, for example, the mask wearing policy at block 702 may indicate one or more environmental conditions that may be met in order for the mask wearing policy to be enforced.

In this optional or additional aspect, at block 704, the determining at block 306 of whether the one or more persons are in violation of the mask wearing policy may include determining whether a first environmental threshold of the one or more environmental thresholds is met. For example, in an aspect the computing device 130, the processor 133, the memory 135, the mask detection component 137, and/or the determining component 230 may be configured to or may comprise means for determining whether a first environmental threshold of the one or more environmental thresholds is met.

For example, at block 704, the determining may include determining whether at least one environmental threshold indicated by the mask wearing policy is met. For example, if or when the mask wearing policy indicates a humidity threshold, the determining at block 704 may include determining whether the humidity level of environment 110 (or of one or more areas 115) meets the humidity threshold.

Further, for example, the determining at block 704 may be performed to determine whether at least one environmental threshold indicated by the mask wearing policy is not met. And, as such, allow for environmental factors to affect enforcement of the mask wearing policy.

In this optional or additional aspect, at block 706, the determining at block 306 of whether the one or more persons are in violation of the mask wearing policy may include determining that a first person of the one or more persons is wearing a mask incorrectly. For example, in an aspect the computing device 130, the processor 133, the memory 135, the mask detection component 137, and/or the determining component 230 may be configured to or may comprise means for determining that a first person of the one or more persons is wearing a mask incorrectly.

For example, at block 706, the determining may include determining whether each person of the one or more persons 150, 160 is wearing a mask incorrectly. In some aspects, if or when the respective facial features corresponding to a person (e.g., 150) does not comprise nose and mouth facial features, the determining component 230 may determine that the person is wearing a mask correctly, such as the one or more persons 150. That is, if or when both of a person's nose and mouth are hidden from view, the person is likely to be wearing a mask correctly. In other optional or additional aspects, if or when the respective facial features corresponding to another person (e.g., 160) comprise nose or mouth facial features, the determining component 230 may determine that the person is wearing a mask incorrectly, such as the one or more persons 160. That is, if or when a person's nose or mouth are visible, the person is unlikely to be wearing a mask correctly.

Further, for example, the determining at block 706 may be performed to automatically determine that at least one person of the one or more persons 160 in environment 110 is wearing a mask incorrectly or is not wearing a mask. Such a determination may allow the video surveillance system 100 to automatically enforce mask wearing policies without the need for time and labor intensive manual processes. Thus, aspects presented herein may increase accuracy and effectiveness of the enforcement of mask wearing policies over conventional video surveillance systems.

In this optional or additional aspect, at block 708, the determining at block 306 of whether the one or more persons are in violation of the mask wearing policy may include assigning a mask wearing violation to the first person based on determining that the first person is wearing the mask incorrectly and that the first environmental threshold is not met. For example, in an aspect the computing device 130, the processor 133, the memory 135, the mask detection component 137, and/or the assigning component 245 may be configured to or may comprise means for assigning a mask wearing violation to the first person based on determining that the first person is wearing the mask incorrectly and that the first environmental threshold is not met.

For example, at block 708, the assigning may include generating a mask wearing policy violation based on determining that the first person is wearing the mask incorrectly and that the first environmental threshold is not met. In some aspects, the assigning at block 708 may further include causing the generating component 235 to generate an alert in response to generating the mask wearing policy violation.

Further, for example, the assigning at block 708 may be performed to enforce environmental thresholds indicated by the mask wearing policy. As such, the video surveillance system 100 may allow for environmental factors to affect enforcement of the mask wearing policy.

Figure 8:
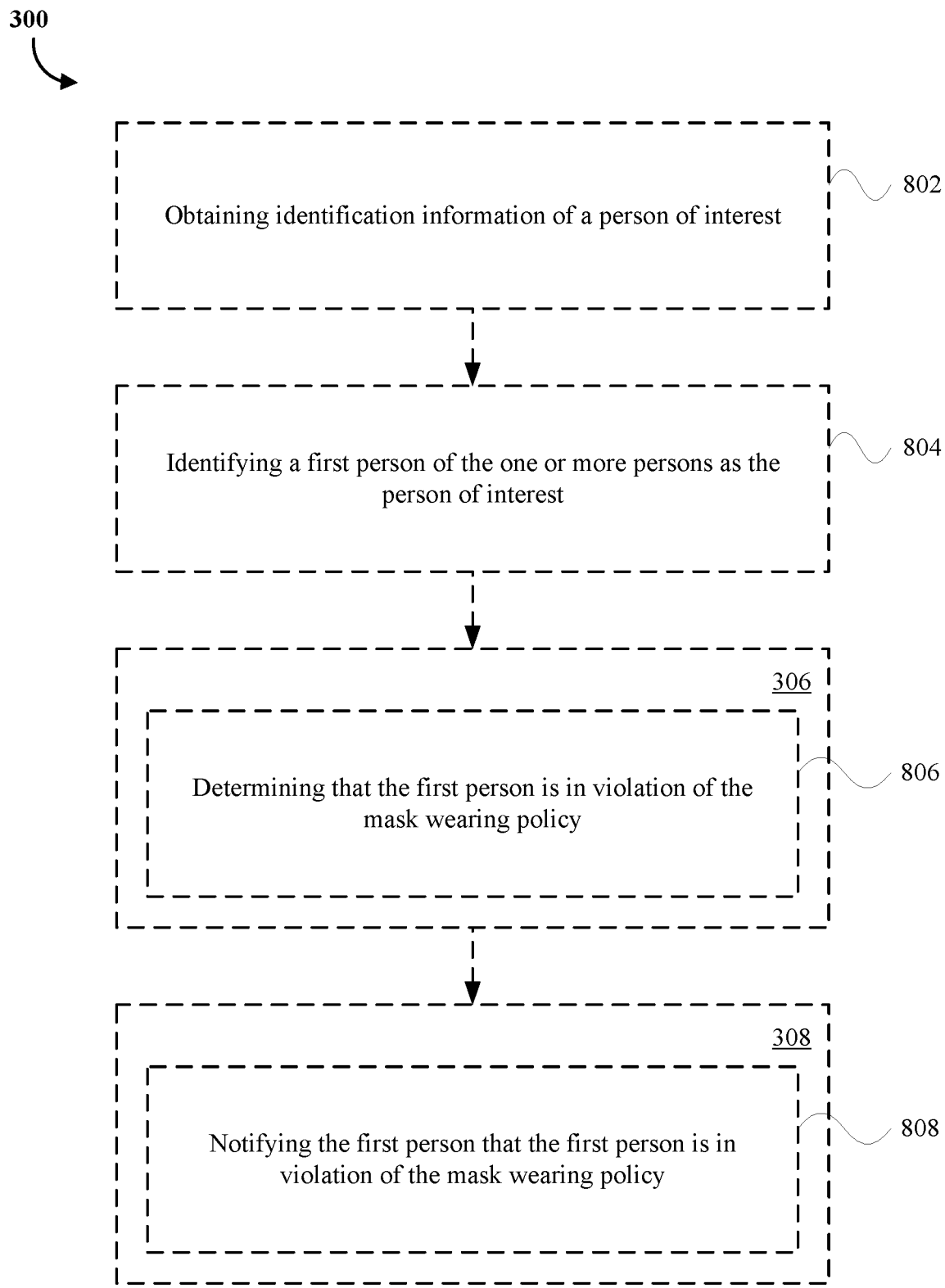
FIG. 8 is a flowchart of fifth additional or optional steps of the method of detecting incorrect mask usage to be performed by the computing device, in accordance with various aspects of the present disclosure.

Referring to FIG. 8, in an optional or additional aspect that may be combined with any other aspect, at block 802, the method 300 may further include obtaining identification information of a person of interest. For example, in an aspect, the computing device 130, the processor 133, the memory 135, the mask detection component 137, and/or the obtaining component 270 may be configured to or may comprise means for obtaining the identification information of the person of interest.

For example, the obtaining at block 802 may include obtaining the identification information of the person of interest, such as at least one image of the person of interest. Alternatively or additionally, the identification information may comprise a database record comprising information with which a person 150, 160 may be identified, such as facial features. In some aspects, the identification information may comprise other identifying information such as name, address, employer, access card identification number, key fob identification number, biometric information, and the like.

Further, for example, the obtaining at block 802 may be performed to allow for identification of the person of interest from the one or more persons 150, 160 detected in the video frames of the one or more video feeds.

In this optional or additional aspect, at block 804, the method 300 may further include identifying a first person of the one or more persons as the person of interest. For example, in an aspect, the computing device 130, the processor 133, the memory 135, the mask detection component 137, and/or the identifying component 275 may be configured to or may comprise means for identifying the first person of the one or more persons as the person of interest.

For example, the identifying at block 804 may include comparing the at least one image of the person of interest with the video frames in which the one or more persons appear in order to determine whether the person of interest appears in the video frames. In some aspects, the identifying at block 804 may include using facial recognition techniques to identify the person of interest. Alternatively or additionally, the identifying at block 804 may utilize a facial recognition algorithm to compare facial features of the one or more persons that appear in the video frames with the identifying information of the person of interest.

In some aspects, the identifying at block 804 may include identifying the first person as the person of interest according to the identification information provided to the identifying component 275.

Further, for example, the identifying at block 804 may be performed to determine whether a person of interest is in violation of the mask wearing policy.

In this optional or additional aspect, at block 806, the determining at block 306 of whether the one or more persons are in violation of the mask wearing policy may include determining that the first person is in violation of the mask wearing policy. For example, in an aspect, the computing device 130, the processor 133, the memory 135, the mask detection component 137, and/or the determining component 230 may be configured to or may comprise means for determining that the first person is in violation of the mask wearing policy.

For example, the determining at block 806 may include determining that the person of interest is one of the one or more persons in violation of the mask wearing policy.

Further, for example, the determining at block 806 may be performed to whether a person of interest is in violation of the mask wearing policy. And, as such, allow the mask detection component 137 to notify the person of interest of the mask wearing policy violation.

In this optional aspect, at block 808, the generating at block 308 of the alert may include notifying the first person that the first person is in violation of the mask wearing policy. For example, in an aspect, the computing device 130, the processor 133, the memory 135, the mask detection component 137, and/or the notifying component 260 may be configured to or may comprise means for notifying the first person that the first person is in violation of the mask wearing policy.

For example, the notifying at block 808 may include causing the speaker 125 to generate an audible alarm and/or a spoken message that may be audible by the person of interest. In some aspects, the notifying at block 808 may include causing the display 127 to display textual, graphical, and/or video messages that may be visible by the person of interest. In other optional or additional aspects, the notifying at block 808 may include transmitting a message (e.g., email, SMS, automated voice call) to the person of interest comprising an indication that the person of interest is in violation of the mask wearing policy. In other optional or additional aspects, the notifying at block 808 may include transmitting to other interested parties (e.g., security personnel, building management, law enforcement, civil health authorities) a message (e.g., email, SMS, automated voice call) comprising an indication that the person of interest is in violation of the mask wearing policy Further, for example, the notifying at block 808 may be performed to notify the person of interest that they are in violation of the mask wearing policy. Alternatively or additionally, the notifying at block 808 may be performed to notify other interested parties that the person of interest is in violation of the mask wearing policy.

Figure 9:
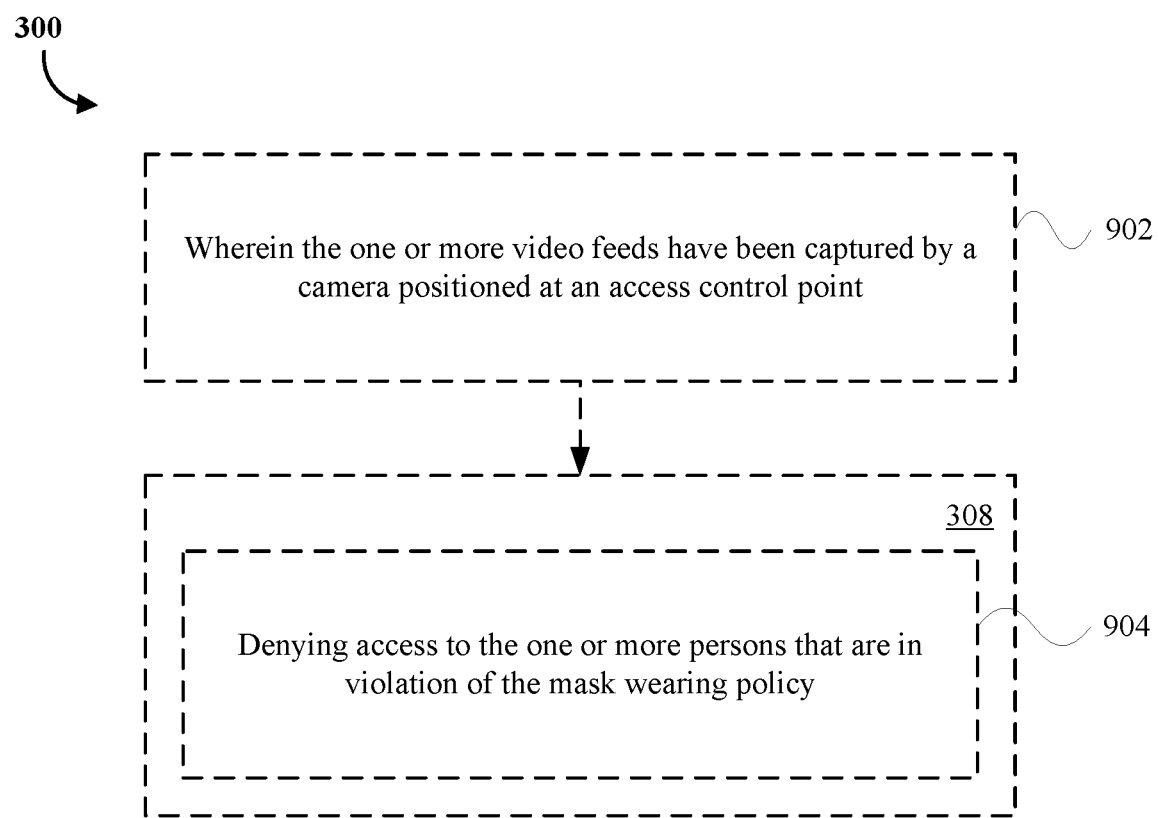
FIG. 9 is a flowchart of sixth additional or optional steps of the method of detecting incorrect mask usage to be performed by the computing device, in accordance with various aspects of the present disclosure.

Referring to FIG. 9, in an optional or additional aspect that may be combined with any other aspect, at block 902, the method 300 may further include wherein the one or more video feeds have been captured by a camera positioned at an access control point.

In this optional aspect, at block 904, the generating at block 308 of the alert may include preventing access to the one or more persons that are in violation of the mask wearing policy. For example, in an aspect, the computing device 130, the processor 133, the memory 135, the mask detection component 137, and/or the preventing component 265 may be configured to or may comprise means for preventing access to the one or more persons that are in violation of the mask wearing policy.

For example, the denying at block 904 may include causing the access control point 117 to deny access to the environment 110 to one or more persons that have been determined to be in violation of the mask wearing policy (e.g., incorrect mask wearing).

Further, for example, the denying at block 904 may be performed to enforce the mask wearing policy by denying access to the environment 110 to one or more persons 160 that are not wearing a mask correctly.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

In one or more aspects, the functions described herein may be implemented in hardware, software, firmware, or any combination thereof. If or when implemented in software, the functions may be stored or transmitted as one or more instructions or code on a computer-readable medium. The computer-readable medium (also referred to as computer-readable media) may include a computer storage medium which may be referred to as a non-transitory computer-readable medium. A non-transitory computer-readable medium may exclude transitory signals. Computer-readable media may include both computer storage media and communication media including any medium that may facilitate transfer of a computer program from one place to another. A storage medium may be any available media that can be accessed by a computer. By way of example, and not limitation, such computer-readable media can comprise RAM, ROM, electrically erasable programmable ROM ("EEPROM"), compact disc read-only memory ("CD-ROM") or other optical disk storage, magnetic disk storage or other magnetic storage devices, or any other medium that can be used to store desired program code in the form of instructions or data structures and that can be accessed by a computer. Disk and disc, as used herein, may include compact disc (CD), laser disc, optical disc, digital versatile disc (DVD), floppy disk and Blu-ray disc, where disks usually reproduce data magnetically, while discs usually reproduce data optically with lasers. Combinations of the above may also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of detecting incorrect mask usage, comprising:
   monitoring video frames of one or more video feeds of an environment comprising an enforcement area and at least one non-enforcement area;
   detecting, via image processing, one or more persons in the video frames;
   determining, via image processing, that the one or more persons is inside of the enforcement area of the environment based on a location of the one or more persons within a first area of the video frames associated with the enforcement area and not a second area of the video frames associated with the at least one non-enforcement area;
   determining, via image processing, based at least in part on the one or more persons being inside the enforcement area, whether the one or more persons are in violation of a mask wearing policy indicative of an occupancy rate threshold formed by modifying a maximum occupancy rate of the enforcement area by a person-to-person health preserving minimum spacing distance; and
   generating an alert in response to determining that the one or more persons are in violation of the mask wearing policy,
   wherein the one or more video feeds are captured by one or more cameras that are calibrated with a camera enrollment process that uses one or more reference objects of a known physical size and known distance from the one or more cameras by an image processing algorithm that provides ratios for converting pixel distances of video frames to physical distances in the environment.

2. The method of claim 1, further comprising:
   providing the video frames to a facial feature detection algorithm, the facial feature detection algorithm being configured to detect respective facial features of the one or more persons; and
   wherein determining whether the one or more persons are in violation of the mask wearing policy comprises determining whether the one or more persons are wearing a mask correctly based at least on the respective facial features of the one or more persons.

3. The method of claim 2, wherein determining whether one or more persons are wearing the mask correctly comprises:
   determining that the respective facial features of a first person of the one or more persons does not comprise nose and mouth facial features; and
   determining that the first person is wearing a mask correctly.

4. The method of claim 1,
   wherein determining whether the one or more persons are in violation of the mask wearing policy comprises:
      determining that a first person is wearing a mask incorrectly; and
      assigning a mask wearing violation to the first person based on determining that the first person is wearing the mask incorrectly inside of the enforcement area.

5. The method of claim 1,
   wherein determining whether the one or more persons are in violation of the mask wearing policy comprises:
      determining an occupancy rate of an area delineated by the video frames;
      determining whether the occupancy rate exceeds the occupancy rate threshold modified by the determined person-to-person health preserving minimum spacing distance; and
      assigning a mask wearing violation to the one or more persons based on determining that the occupancy rate exceeds the occupancy rate threshold.

6. The method of claim 1,
   wherein the mask wearing policy further indicates one or more environmental thresholds; and
   wherein determining whether the one or more persons are in violation of the mask wearing policy comprises:
      determining whether a first environmental threshold of the one or more environmental thresholds is met;
      determining that a first person of the one or more persons is wearing a mask incorrectly;
      assigning a mask wearing violation to the first person based on determining that the first person is wearing the mask incorrectly and that the first environmental threshold is not met.

7. The method of claim 1, further comprising:
   obtaining identification information of a person of interest;
   identifying a first person of the one or more persons as the person of interest;
   wherein determining whether the one or more persons are in violation of the mask wearing policy comprises determining that the first person is in violation of the mask wearing policy; and
   wherein generating the alert comprises notifying the first person that the first person is in violation of the mask wearing policy.

8. The method of claim 1,
   wherein the one or more video feeds have been captured by a camera positioned at an access control point; and
   wherein generating the alert comprises denying access to the one or more persons that are in violation of the mask wearing policy.

9. The method of claim 1, wherein generating the alert comprises providing a video clip of the video frames comprising the one or more persons that are in violation of the mask wearing policy.

10. The method of claim 1, wherein generating the alert comprises:

determining an area delineated by the video frames comprising the one or more persons in violation of the mask wearing policy; and notifying people located in the area of a mask wearing policy violation.

11. An apparatus for detecting incorrect mask usage, comprising:

a non-transitory memory storing computer-executable instructions; and a processor communicatively coupled with the non-transitory memory and configured to execute the instructions to:

monitor video frames of one or more video feeds of an environment comprising an enforcement area and at least one non-enforcement area;

detect, via image processing, one or more persons in the video frames;

determine, via image processing, that the one or more persons is inside of the enforcement area of the environment based on a location of the one or more persons within a first area of the video frames associated with the enforcement area and not a second area of the video frames associated with the at least one non-enforcement area;

determine, via image processing, based at least in part on the one or more persons being inside the enforcement area, whether the one or more persons are in violation of a mask wearing policy indicative of an occupancy rate threshold formed by modifying a maximum occupancy rate of the enforcement area by a person-to-person health preserving minimum spacing distance; and generate an alert in response to determining that the one or more persons are in violation of the mask wearing policy, wherein the one or more video feeds are captured by one or more cameras that are calibrated with a camera enrollment process that uses one or more reference objects of a known physical size and known distance from the one or more cameras by an image processing algorithm that provides ratios for converting pixel distances of video frames to physical distances in the environment.

12. The apparatus of claim 11, wherein the processor is configured to execute further instructions to:

provide the video frames to a facial feature detection algorithm, the facial feature detection algorithm being configured to detect respective facial features of the one or more persons; and wherein to determine whether the one or more persons are in violation of the mask wearing policy comprises to determine whether the one or more persons are wearing a mask correctly based at least on the respective facial features of the one or more persons.

13. The apparatus of claim 12, wherein to determine whether one or more persons are wearing the mask correctly comprises to:

determine that the respective facial features of a first person of the one or more persons does not comprise nose and mouth facial features; and determine that the first person is wearing a mask correctly.

14. The apparatus of claim 11, wherein to determine whether the one or more persons are in violation of the mask wearing policy comprises to:

determine that a first person is wearing a mask incorrectly; and assign a mask wearing violation to the first person based on determining that the first person is wearing the mask incorrectly inside of the enforcement area.

15. The apparatus of claim 11, wherein to determine whether the one or more persons are in violation of the mask wearing policy comprises to:

determine an occupancy rate of an area delineated by the video frames;

determine whether the occupancy rate exceeds the occupancy rate threshold modified by the determined person-to-person health preserving minimum spacing distance; and assign a mask wearing violation to the one or more persons based on determining that the occupancy rate exceeds the occupancy rate threshold.

16. The apparatus of claim 11, wherein the mask wearing policy further indicates one or more environmental thresholds; and wherein to determine whether the one or more persons are in violation of the mask wearing policy comprises:

determine whether a first environmental threshold of the one or more environmental thresholds is met;

determine that a first person of the one or more persons is wearing a mask incorrectly;

assign a mask wearing violation to the first person based on determining that the first person is wearing the mask incorrectly and that the first environmental threshold is not met.

17. The apparatus of claim 11, wherein the processor is configured to execute further instructions to:

obtain identification information of a person of interest;

identify a first person of the one or more persons as the person of interest;

wherein to determine whether the one or more persons are in violation of the mask wearing policy comprises to determine that the first person is in violation of the mask wearing policy; and wherein to generate the alert comprises to notify the first person that the first person is in violation of the mask wearing policy.

18. The apparatus of claim 11, wherein the one or more video feeds have been captured by a camera positioned at an access control point; and wherein to generate the alert comprises to deny access to the one or more persons that are in violation of the mask wearing policy.

19. The apparatus of claim 11, wherein to generate the alert comprises to provide a video clip of the video frames comprising the one or more persons that are in violation of the mask wearing policy.

20. The apparatus of claim 11, wherein to generate the alert comprises to:

determine an area delineated by the video frames comprising the one or more persons in violation of the mask wearing policy; and notify people located in the area of a mask wearing policy violation.

21. An apparatus for detecting incorrect mask usage, comprising:

means for monitoring video frames of one or more video feeds of an environment comprising an enforcement area and at least one non-enforcement area;

means for detecting, via image processing, one or more persons in the video frames;

means for determining, via image processing, that the one or more persons is inside of the enforcement area of the environment based on a location of the one or more persons within a first area of the video frames associated with the enforcement area and not a second area of the video frames associated with the at least one non-enforcement area;

means for determining, via image processing, based at least in part on the one or more persons being inside the enforcement area, whether the one or more persons are in violation of a mask wearing policy indicative of an occupancy rate threshold formed by modifying a maximum occupancy rate of the enforcement area by a person-to-person health preserving minimum spacing distance; and means for generating an alert in response to determining that the one or more persons are in violation of the mask wearing policy, wherein the one or more video feeds are captured by one or more cameras that are calibrated with a camera enrollment process that uses one or more reference objects of a known physical size and known distance from the one or more cameras by an image processing algorithm that provides ratios for converting pixel distances of video frames to physical distances in the environment.

22. A non-transitory computer-readable medium storing computer-readable instructions for detecting incorrect mask usage, executable by a processor to:

monitor video frames of one or more video feeds of an environment comprising an enforcement area and at least one non-enforcement area;

detect, via image processing, one or more persons in the video frames;

determining, via image processing, that the one or more persons is inside of the enforcement area of the environment based on a location of the one or more persons within a first area of the video frames associated with the enforcement area and not a second area of the video frames associated with the at least one non-enforcement area;

determine, via image processing, based at least in part on the one or more persons being inside the enforcement area, whether the one or more persons are in violation of a mask wearing policy indicative of an occupancy rate threshold formed by modifying a maximum occupancy rate of the enforcement area by a person-to-person health preserving minimum spacing distance; and generate an alert in response to determine that the one or more persons are in violation of the mask wearing policy, wherein the one or more video feeds are captured by one or more cameras that are calibrated with a camera enrollment process that uses one or more reference objects of a known physical size and known distance from the one or more cameras by an image processing algorithm that provides ratios for converting pixel distances of video frames to physical distances in the environment.

23. The method of claim 1, wherein if one or more persons is determined to be in the second area of the video frames associated with the at least one non-enforcement area, the one or more persons are not determined to be in violation of the mask wearing policy and an alert is not generated.

24. The method of claim 1, wherein the mask wearing policy comprises a minimum occupancy rate threshold that indicates a minimum quantity of persons for simultaneously occupying the enforcement area for the mask wearing policy to be enforced, further comprising:

determining that the one or more persons inside of the enforcement area meet the minimum occupancy rate threshold; and wherein determining whether the one or more persons are in violation of the mask wearing policy is in response to the minimum occupancy rate threshold being met.

* * * * *